United States Patent
Tran et al.

(10) Patent No.: US 10,469,116 B2
(45) Date of Patent: Nov. 5, 2019

(54) PORTABLE COMMUNICATION DEVICE PROVIDING CONFIGURABLE WEARABLE ARCHITECTURE

(71) Applicant: MOTOROLA SOLUTIONS, INC., Chicago, IL (US)

(72) Inventors: Chi T. Tran, Wauwatosa, WI (US);
Jorge L. Garcia, Plantation, FL (US);
Ryan M. Nilsen, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1 day.

(21) Appl. No.: 15/841,470

(22) Filed: Dec. 14, 2017

(65) Prior Publication Data
US 2019/0190557 A1    Jun. 20, 2019

(51) Int. Cl.
| | |
|---|---|
| *H04B 1/3827* | (2015.01) |
| *H04N 7/18* | (2006.01) |
| *H04R 3/00* | (2006.01) |
| *H04B 1/38* | (2015.01) |
| *H04B 1/3883* | (2015.01) |

(52) U.S. Cl.
CPC .............. *H04B 1/385* (2013.01); *H04B 1/38* (2013.01); *H04N 7/185* (2013.01); *H04R 3/00* (2013.01); *H04B 1/3883* (2013.01); *H04B 2001/3855* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 4,895,286 A | 1/1990 | Derosa | |
| 5,829,652 A | 11/1998 | Denzer et al. | |
| 5,886,739 A | 3/1999 | Winningstad | |
| 8,786,680 B2 | 7/2014 | Shiratori et al. | |
| 8,941,777 B1 | 1/2015 | Ratner | |
| 9,083,860 B2 | 7/2015 | Sabripour et al. | |
| 9,554,041 B1 | 1/2017 | Shin et al. | |
| 10,104,507 B1 * | 10/2018 | Pinder | H04W 4/026 |
| 2003/0133008 A1 | 7/2003 | Stephenson | |
| 2003/0173383 A1 | 9/2003 | Greene | |

(Continued)

FOREIGN PATENT DOCUMENTS

WO    2017119653 A1    7/2017

OTHER PUBLICATIONS

Docking station hidden camera, YouTube, 2016 https://www.youtube.com/watch?v=9TG0J-IJ8wM (Year: 2016).*

(Continued)

*Primary Examiner* — Jianxun Yang
(74) *Attorney, Agent, or Firm* — Barbara R. Doutre

(57) ABSTRACT

A portable communication device (200) provides a remote speaker microphone (RSM) (204) that is adaptable to a plurality of interchangeable bridge interface modules. The plurality of interchangeable bridge interface modules may comprise interchangeable camera (212), (218) and non-camera (220) bridge interface modules that couple between the RSM (204) and a power source (208). The power source (208) may also be interchangeable via a portable battery (212) or corded power module (214). The portable communication device is shoulder mountable and well suited to portable public safety applications.

12 Claims, 32 Drawing Sheets

(56) References Cited

U.S. PATENT DOCUMENTS

| | | | |
|---|---|---|---|
| 2003/0215010 A1 | 11/2003 | Kashiwa | |
| 2004/0048638 A1* | 3/2004 | Inomata | H01M 2/1022 455/572 |
| 2005/0176461 A1 | 8/2005 | Bozzone et al. | |
| 2007/0111754 A1 | 5/2007 | Marshall et al. | |
| 2008/0124069 A1* | 5/2008 | Basho | G03B 27/58 396/427 |
| 2012/0075177 A1* | 3/2012 | Jacobsen | G06F 3/011 345/156 |
| 2012/0319487 A1* | 12/2012 | Shah | H02J 7/0054 307/66 |
| 2013/0210563 A1* | 8/2013 | Hollinger | H04N 5/2252 473/570 |
| 2014/0038668 A1* | 2/2014 | Vasavada | H04L 65/4061 455/556.1 |
| 2015/0140386 A1* | 5/2015 | Huang | H01M 2/1022 429/98 |
| 2016/0098138 A1 | 4/2016 | Park et al. | |
| 2016/0112636 A1 | 4/2016 | Yamaguchi et al. | |
| 2016/0182850 A1 | 6/2016 | Thompson | |
| 2017/0105510 A1 | 4/2017 | Tran et al. | |

OTHER PUBLICATIONS

Panasonic kx-tg6582 manual, 2010 ftp://ftp.panasonic.com/telephone/om/kx-tg6582_en_om.pdf (Year: 2010).* walmart.com, Shoulder Mount Support Pad Stabilizer for Video DV Camcorder HD DSLR DV Camera, https://www.walmart.com/ip/Shoulder-Mount-Support-Pad-Stabilizer-for-Video-DV-Camcorder-HD-DSLR-DV-Camera/825037903[Jun. 21, 2017 1:00:01 PM, all pages.

Samsung—parts.net, Samsung Gear 360(2016) Lenses—Samsung-parts.net, http://www.samsung-parts.net/epages/Samsung-Parts.sf/en_GB/?ObjectPath=/Shops/Samsung-Parts/Products/GH67-02946A, downloaded from internet: Nov. 9, 2017, all pages.

The International Search Report and the Written Opinion corresponding serial No. PCT/US2018/063205 filed Nov. 30, 2018, dated Mar. 14, 2019, all pages.

* cited by examiner

PORTABLE COMMUNICATION DEVICE PROVIDING CONFIGURABLE WEARABLE ARCHITECTURE

FIELD OF THE INVENTION

The present invention relates generally to portable communication devices and more particularly to portable shoulder mountable communication devices that are adaptable to a variety of functional configurations.

BACKGROUND

Public safety environments, such as law enforcement and fire rescue, are increasingly seeking out improved approaches to managing a variety of portable public safety communication devices. In addition to managing such devices, there is an increased desire to provide additional functionality to a portable public safety communication device, such as video recording capability. Attempting to incorporate video technology into a portable public safety communication device presents design challenges associated with regards to size, weight, ruggedness, and ease of use. While there exist consumer type communication devices with video options, such devices do not typically offer architectures suitable to public safety applications. A public safety device that could be worn on the body and provide some level of hands-free functionality would be highly beneficial to public safety personnel. The ability of a public safety device to adapt to different functional configurations would enhance product customization for individual users and the various changing environments within which they work.

Accordingly, there is a need for a product architecture configurable to adapt multiple portable design derivatives for a wearable portable communication device.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
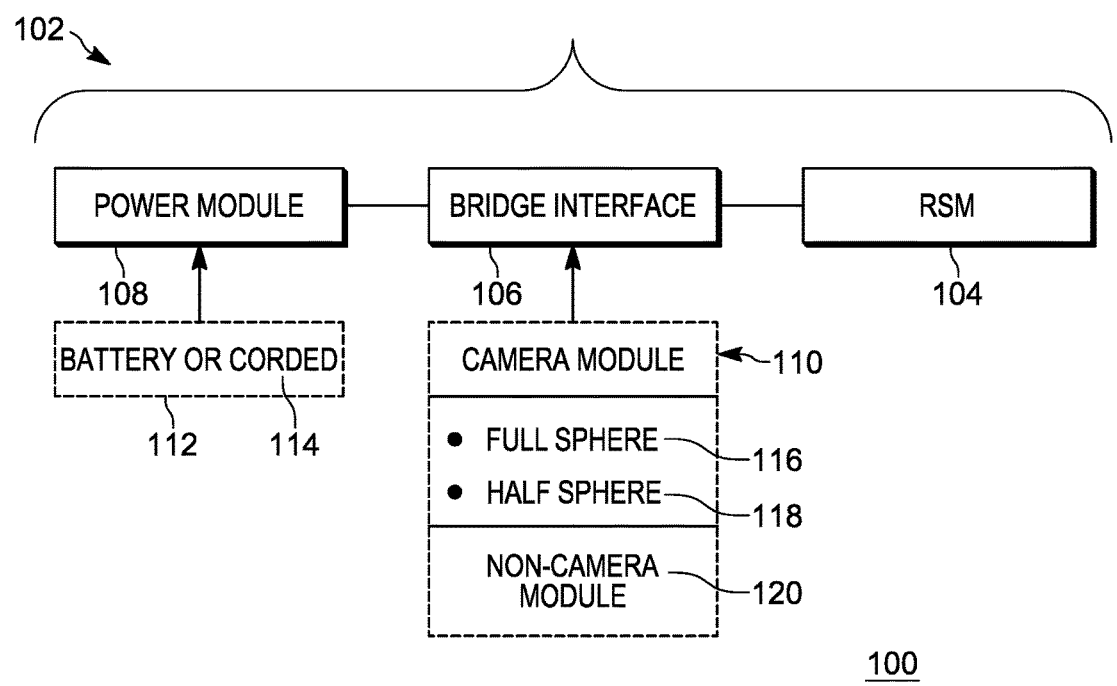
FIG. 1 is a block diagram for a portable communication device in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a portable communication device with interchangeable bridge interface modules. The portable communication device is configured for shoulder mountable applications and comprises and remote speaker microphone (RSM) and a power source module. The interchangeable bridge interface modules comprise interchangeable camera and non-camera modules providing a bridge interface between the RSM and the power source module. The power source module may also be interchangeable in the form of a portable battery and a corded power source. The shoulder mounted communication device advantageously allows user-access to controls of the RSM, such as volume and push-to-talk (PTT) controls, while allowing for hands-free video operation when the device is worn at the shoulder. Hence, the portable communication device is particularly beneficial for public safety environments, such as law enforcement, fire and rescue environments.

Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a block diagram 100 for a portable communication device 102 in accordance with the various embodiments. The portable communication device 102 comprises a remote speaker microphone (RSM) 104, a power source module 108, and an interchangeable bridge interface module 106 for coupling therebetween.

The interchangeable bridge interface module 106 may comprise one of a camera interface module 110 and a non-camera interface module 120. The camera interface module 110 provides for a camera interface connection between the RSM 104 and power source module 108. The non-camera interface module 120 provides for a non-camera interface connection between the RSM 104 and power module 108.

In accordance with the embodiments, the camera interface module 110 may comprise a full spherical video camera module 116 or a hemispherical video camera module. Either module, coupled between the RSM 204 and the power source module 208, provides video capability to the portable communication device 102.

In accordance with some of the embodiments, the power source module 108 may be interchangeable and comprise a portable battery 112 or a corded power source 114. The corded power source 114 may originate from a power source worn on a belt or distributed elsewhere on the body. Hence, the corded source 114 is said to acquire power from an external body-worn battery.

In accordance with the embodiments, the portable communication device 102 comprising remote speaker microphone (RSM) 104 is adaptable to receive at least two interchangeable modules, the at least two interchangeable modules and the RSM 104 being powered by the power source module 108. The at least two interchangeable modules may comprise the camera module 110, for coupling between the RSM 104 and power source module 108, and may comprise the non-camera interface module 120, for coupling between the RSM 104 and power source module 108. In accordance with some embodiments, the power source module 108 may be an interchangeable module which is interchangeable between a portable battery 112 and a corded power source 114. The portable communication device 102 provides a portable, body wearable device for shoulder worn applications particularly well suited to public safety environments, such as law enforcement and fire rescue.

Figure 2:
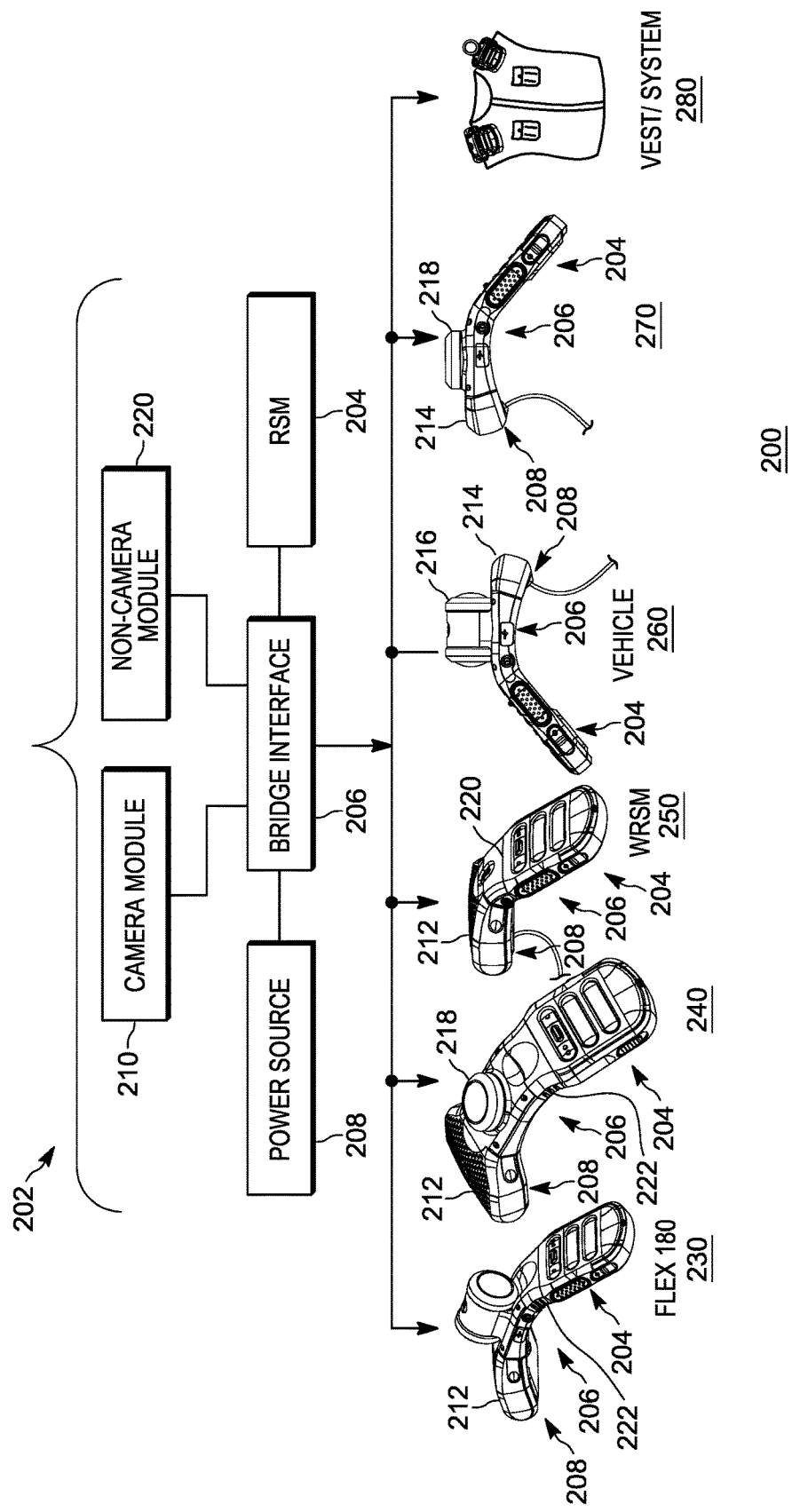
FIG. 2 is a product architecture platform configurable to adapt multiple portable operational design derivatives for a wearable portable communication device in accordance with the various embodiments.

FIG. 2 is a product architecture platform 200 that provides a portable communication device 202 that is adaptable to a plurality of portable operational design derivatives 230, 240, 250, 260, 270, and 280 in accordance with the various embodiments. Product architecture platform 200 can be said to provide for a portable communication device system in which portable communication device 202 comprising RSM 204 and power source module 208 are interfaced via an interchangeable bridge interface module 206, wherein the interchangeable bridge interface module 206 may comprise a plurality of interchangeable interface bridge modules, each adapting the RSM 204 to the plurality of portable operational design derivatives 230, 240, 250, 260, 270.

The portable communication device 202 is formed of front, middle, and back portions respectively configured in a reverse u-shape formation for shoulder mountable applications. The portable communication device 202 comprises a portable, body wearable device for shoulder worn usage particularly well suited to public safety environments, such as law enforcement and fire rescue. All of the portable operational design derivatives 230, 240, 250, 260, and 270 of FIG. 2 provide for a portable communication device that is mountable to a garment, such as a vest, jacket or shirt, as shown at 280.

The RSM 204 comprises a speaker, a microphone, and a push-to-talk (PTT) button, all under the control of one or more internal processors and interoperable with an internal transceiver in a known manner. In accordance with the embodiments, the power source module 206 powers the RSM 204 through interconnection within the bridge interface module 206 when a non-camera bridge interface 220 is coupled between the RSM 204 and the power source module 206. The power source module 206 powers the RSM 204 and additionally powers circuitry associated with the camera when the camera bridge interface module 210 is coupled between the RSM 204 and the power source module 206.

The portable communication device 202 comprises a remote speaker microphone (RSM) 204, a power source module 208, and an interchangeable bridge interface module 206 coupled therebetween. In accordance with the embodiments, the interchangeable bridge interface module 206 comprises a plurality of interchangeable interface bridge modules, each adapting the RSM 204 to the plurality of portable operational design derivatives 230, 240, 250, 260, 270.

The interchangeable bridge interface module 206 may comprise a camera interface module 210 and a non-camera interface module 220. The camera interface module 210 may comprise a full spherical video camera interface module 216 or a hemispherical video camera interface module 218 for bridging between the RSM 204 and power source module 208. The non-camera interface module 220 provides an interconnect bridging between the RSM 204 and power source module 208. Hence, the plurality of portable operational design derivatives comprise: RSM with full spherical video camera, RSM with hemispherical video camera, and RSM with bridge interface without video camera, each powered by power source module 208.

In accordance with some of the embodiments, the power source module 208 of the portable communication device may also be interchangeable and comprise a portable battery 212 or a cabled power source 214. The cabled power module 214 may acquire power from, for example, a vehicular battery source or other remote power source available within the public safety environment.

As previously stated, the portable communication device 202 is formed of front, middle, and back portions respectively configured in a reverse u-shape formation for flexible shoulder mountable applications. The RSM 204 forms the front portion of the portable communication device 202, the bridge interface module 206 forms the middle portion of the portable communication device, and the power source module 208 forms the back portion to the portable communication device.

Wearable studies have concluded that rear shoulder blade surface area drops off quickly from the apex of the shoulder, thereby creating limited area for device length. While the power source module 208 embodied as a corded power source 214 is configured to minimize the length that extends down the back portion of the device, the portable battery 212 presents additional challenges in terms of size and weight.

In accordance with the embodiments, the power source module 208 embodied as the portable battery 212 is advantageously configured to minimize rearward projection for shoulder worn applications. The rearward projection of the portable battery 212 is minimized through the use of a reverse T-shaped configuration in which a vertical portion of the reverse T-shape is coupled to the bridge interface module 206 and a horizontal portion of the reverse T-shape is at the back end portion. When the portable battery 212 is coupled to the bridge interface module 206, the bridge interface module 206 extends the vertical portion of the T-shape. This allows the weight of the portable communication device 202 shown in operational design derivatives 230, 240, and 250 to be evenly distributed between the RSM 204, interface bridge module 206 and portable battery 212. The use of the reverse "T" shaped configuration for the portable battery 212 allows for maximized battery capacity without extending the device too far back on the back shoulder. In other words, configuring the bridge interface module 206 and the portable battery 212 to interconnect in a reverse T-shape configuration above the apex of the shoulder avoids physical interference of the battery with an external object, such as a vehicle seat, while maximizing battery capacity.

In some embodiments, a wireless charging energy coil (not shown) would be in proximity to the portable battery 212 for wireless charging. Wireless charging, such as from a corresponding transmit charging coil, located in a vehicle may provide for vehicular charging options of the portable battery 212.

For other operational design derivatives 260, 270, 280 in which the power source module 208 is embodied as corded power source 214, an optimal distribution of weight is achieved based on the corded power source module 214 not extending too far back on the user's shoulder, thereby advantageously minimizing interference between the shoulder mounted device and other objects, such as a vehicle seat.

In some embodiments, an optional flexible interconnect module 222 may also be coupled between the RSM 204 and the interface bridge module 206 to provide additional flexibility and conformability for the battery powered devices, if desired. For the corded power source derivatives, 260, 270, the flexible interconnect module 222 is removed which permits positioning of the RSM 204 higher on the front of the shoulder which provides balance with the shorter corded power source module 214.

The portable communication device is preferably embodied as a public safety communication device that can be worn on the body and provide access to RSM controls while providing hands-free video functionality which is highly beneficial to public safety personnel. The ability of a public safety device to adapt to different functional configurations comprising camera and non-camera modules as well as different power source options, battery and corded, enhances product customization for individual public safety use cases.

The portable RSM communication device provided by the various embodiments provides significant advantages over standard RSMs in terms of better weight distribution and increased real estate resulting in improved ergonomics and increased functionality. A user can advantageously use the standalone RSM functionality of operational design derivative 250, while maintaining the option to interchange the non-camera bridge interface module 220 with a camera bridge interface module 210 as the need arises. A variety of interconnect mechanisms, known or yet to be developed, can be used for the attachment and detachment of the modules. The interchangeable power modules, and/or flexible interconnect modules provide a further level of product customization. Hence, the portable communication device provides a configurable wearable architecture that is be particularly useful for public safety personnel that move amongst different environments.

FIGS. 3A-3H, 4S-4H, 5A-5H, 6A-6H, 7A-7H provide a plurality of views of a portable communication device formed in accordance with the various embodiments.

Figure 3A:
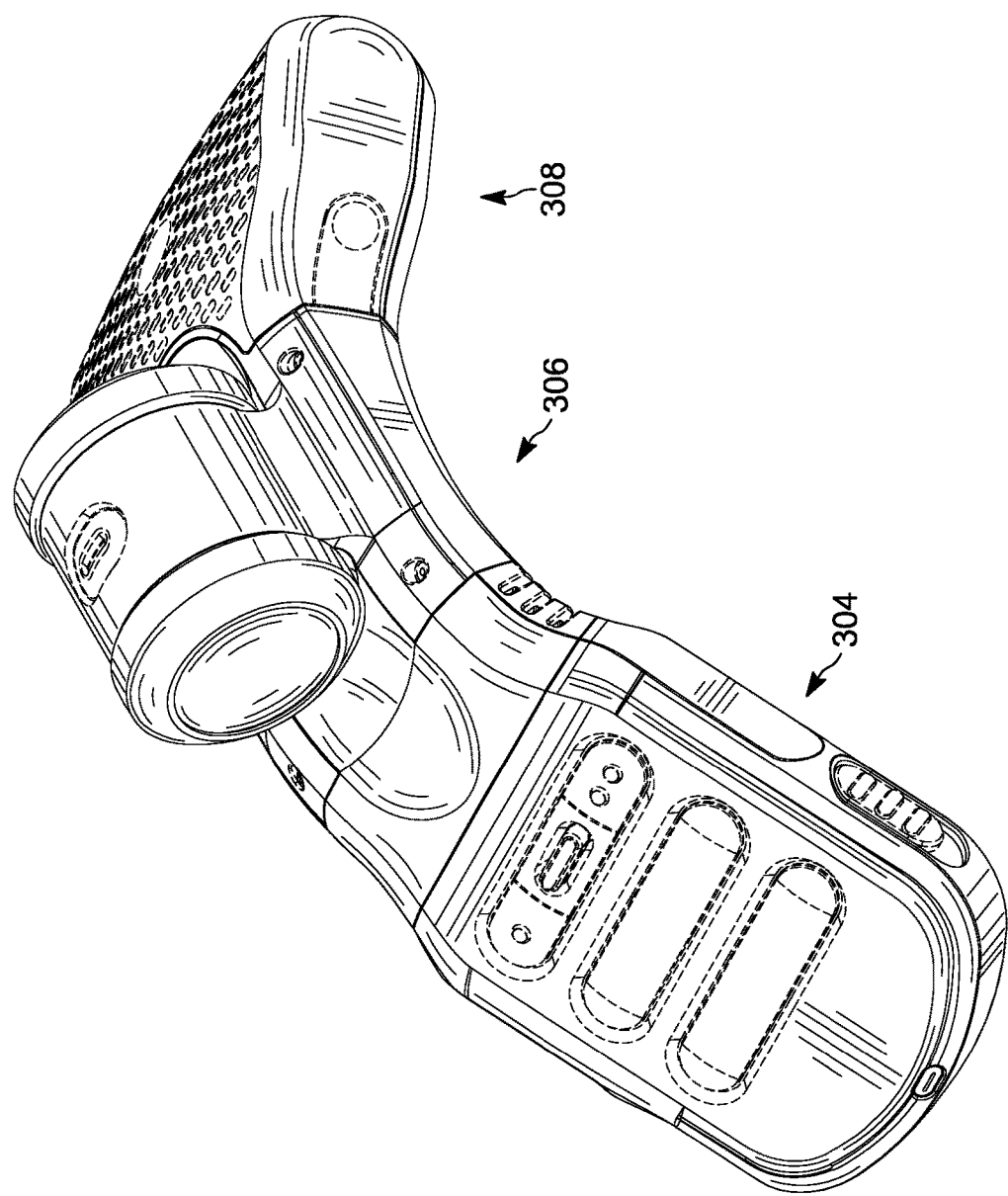
FIGS. 3A-3H provide several views of a portable communication device formed in accordance with a first embodiment.
Figure 3B:
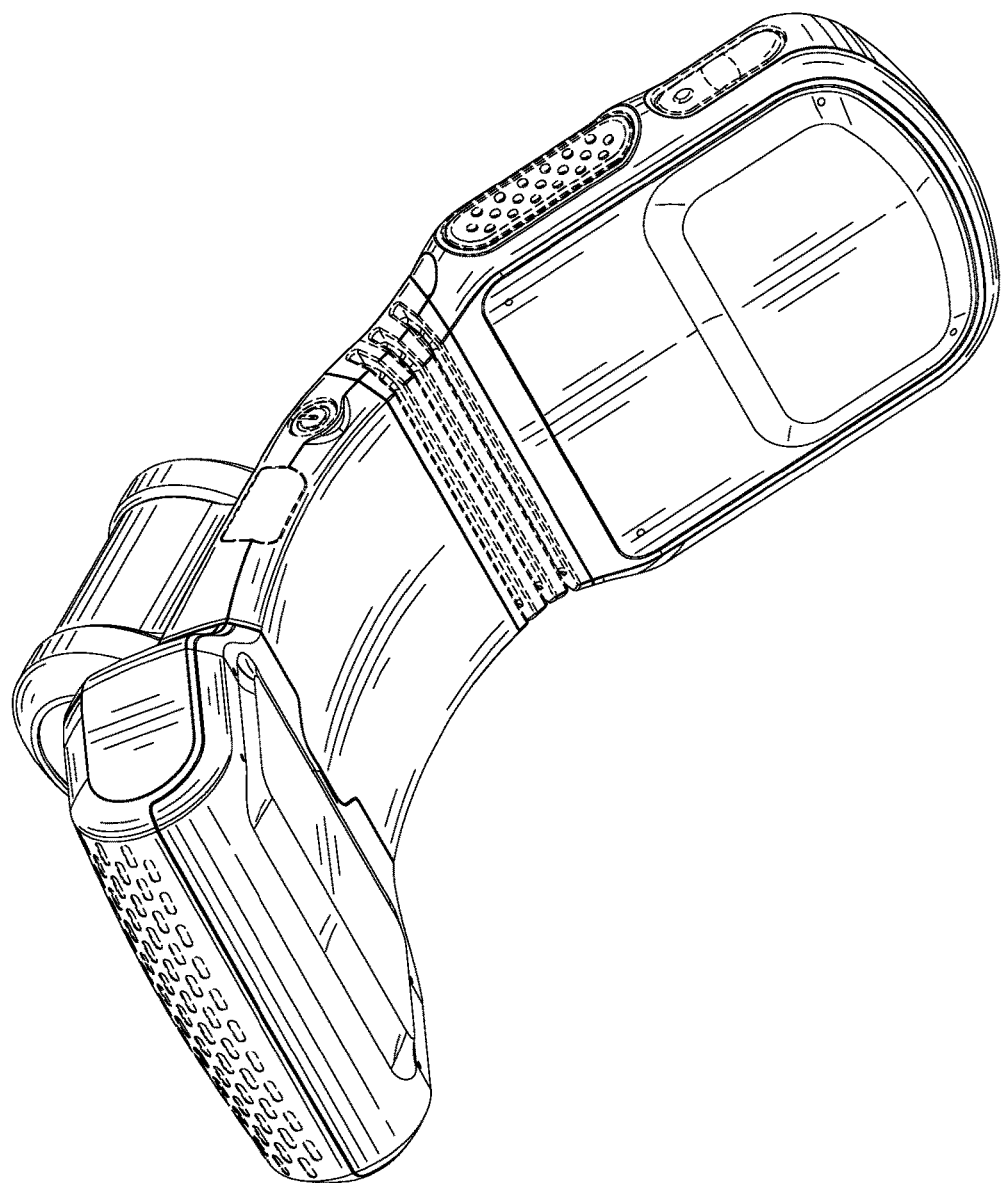
Figure 3C:
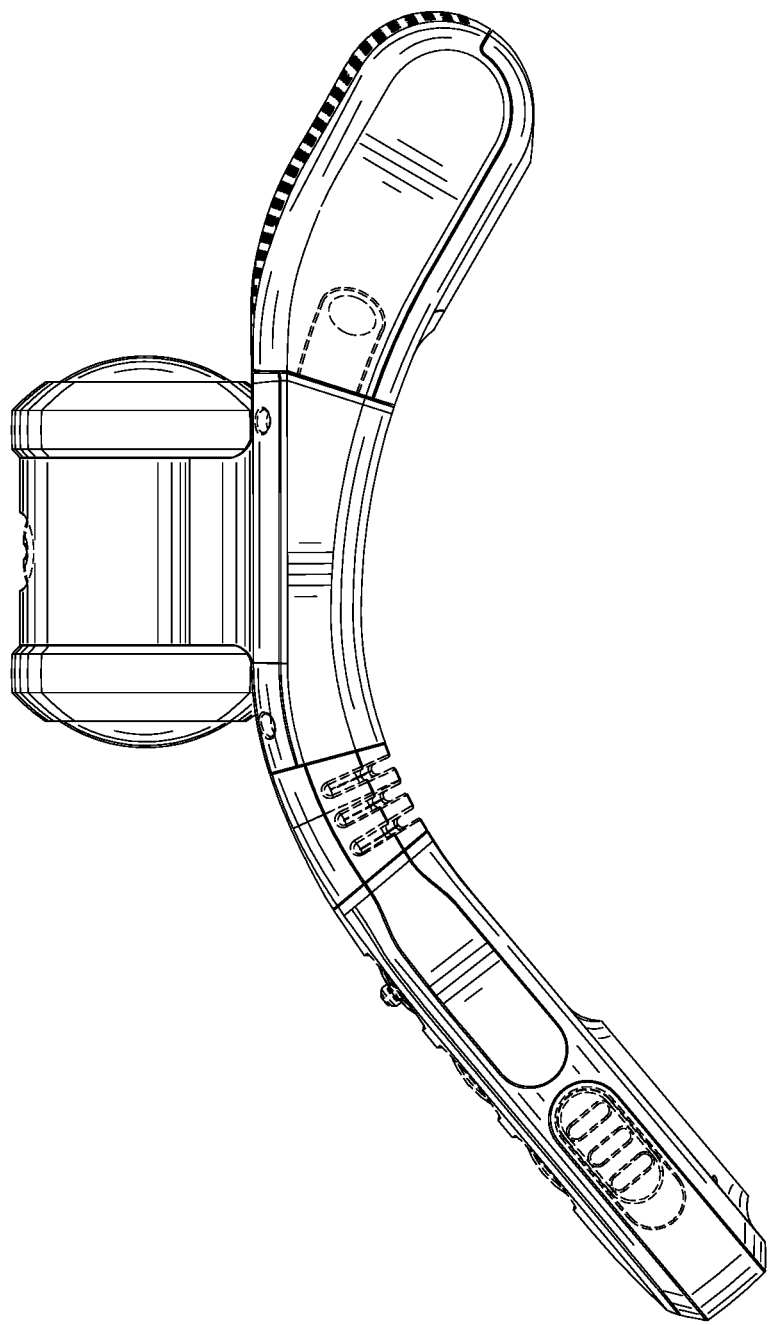
Figure 3D:
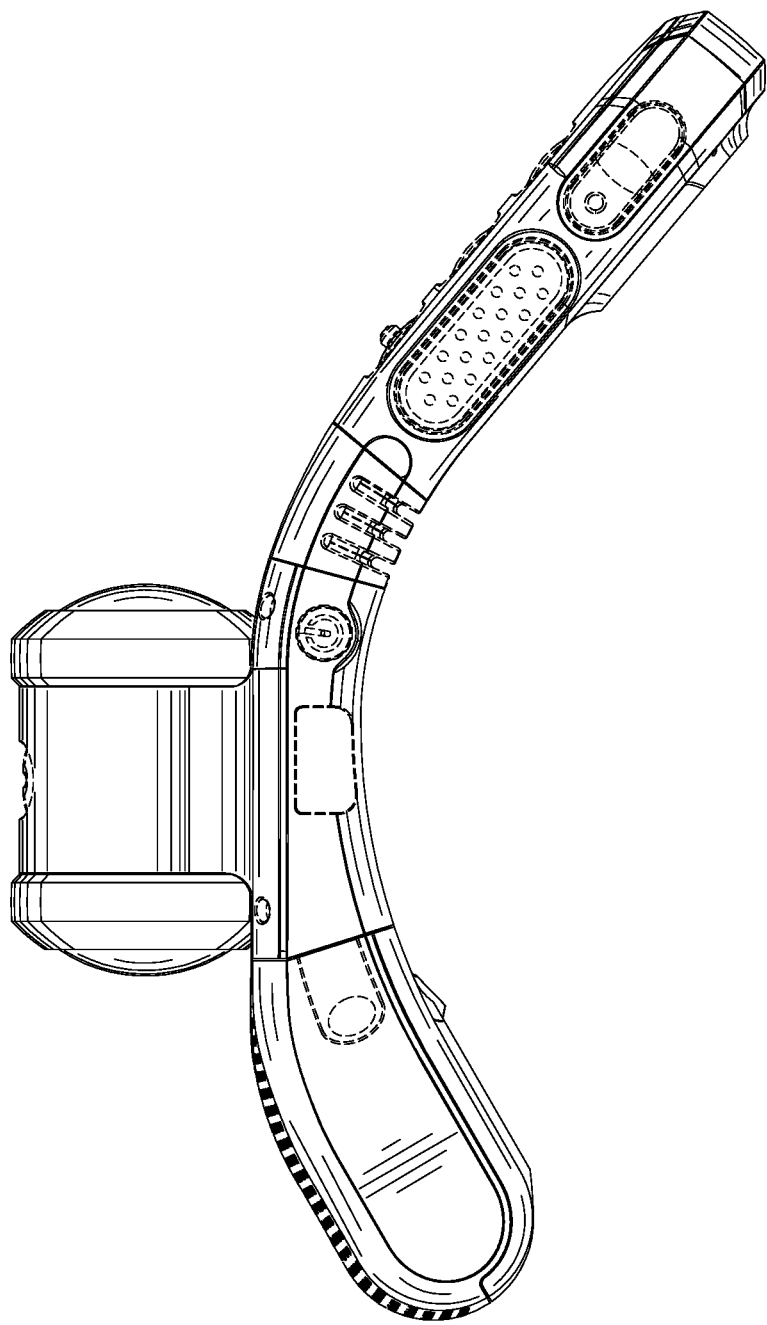
Figure 3E:
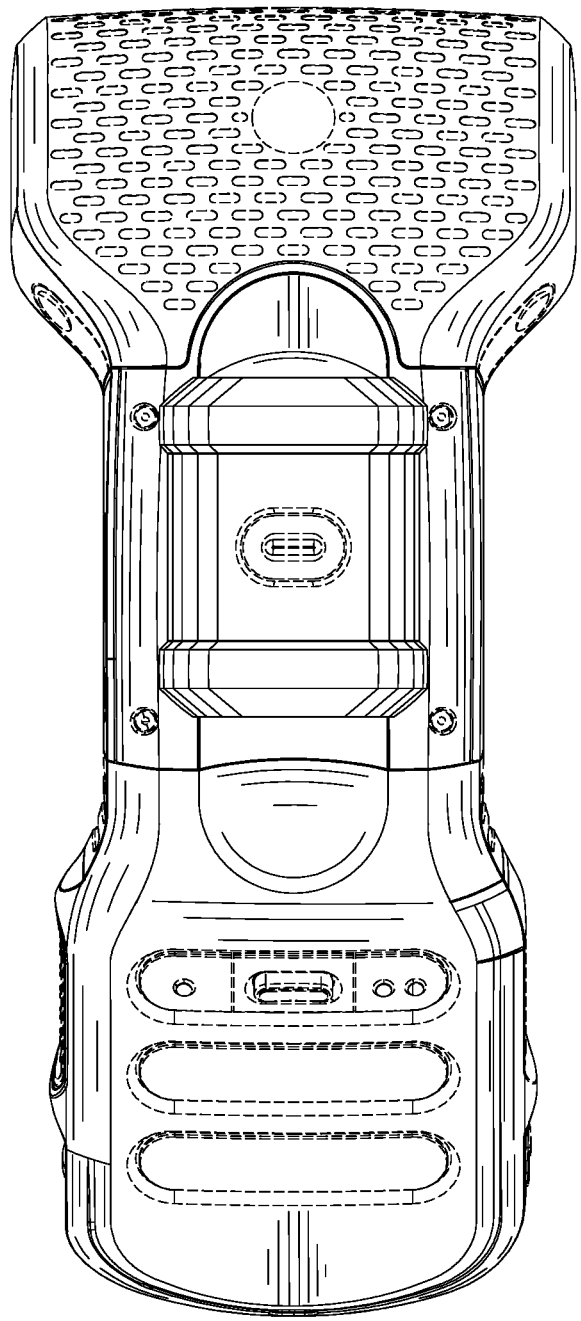
Figure 3F:
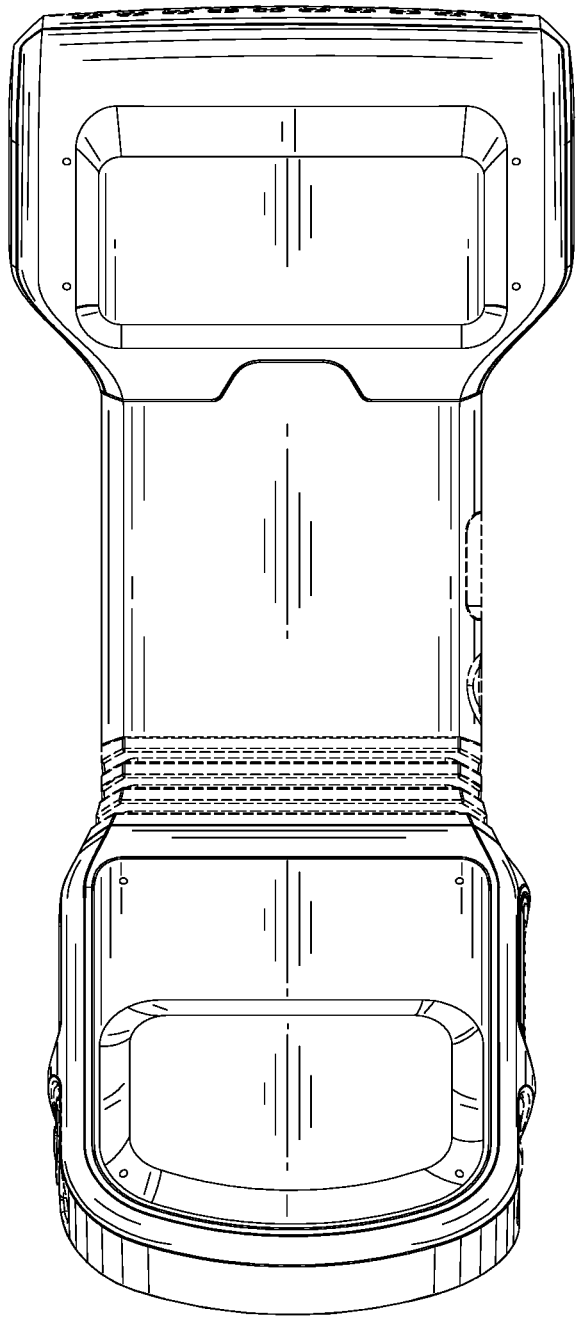
Figure 3G:
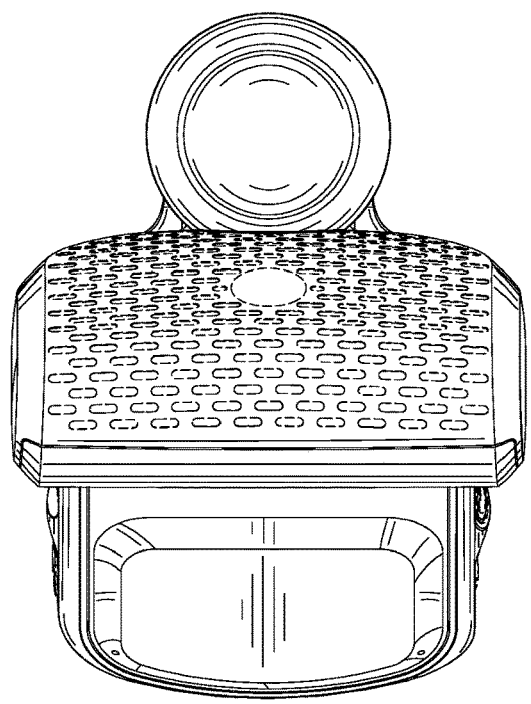
Figure 3H:
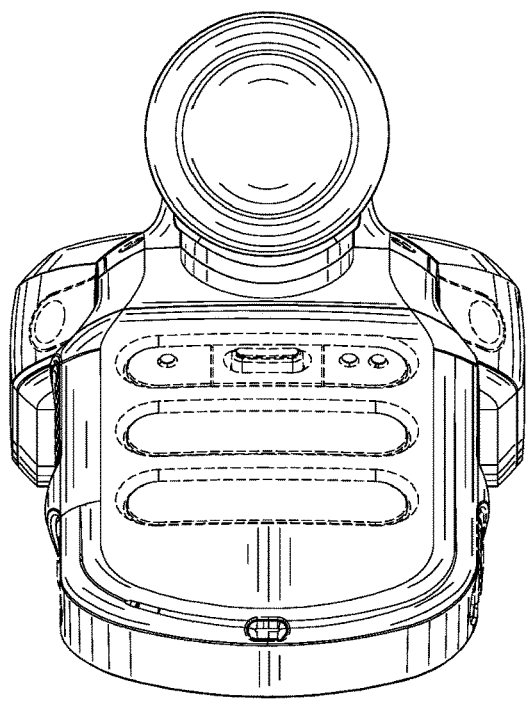

FIGS. 3A-3H provide several views of a portable communication device formed in accordance with a first embodiment. The first embodiment provides for the portable communication device formed of an interchangeable bridge interface module 306, comprising a full spherical camera, mounted between a RSM 304 and a power source 308, shown here as a portable battery. FIG. 3A is an isometric view of the portable communication device. FIG. 3B is a back, isometric view of the portable communication device. FIG. 3C is a first side view of the portable communication device. FIG. 3D is a second side view of the portable communication device. FIG. 3E is a top view of the portable communication device. FIG. 3F is a bottom view of the portable communication device. FIG. 3G is a back view of the portable communication device. FIG. 3H is a front view of the portable communication device.

Figure 4A:
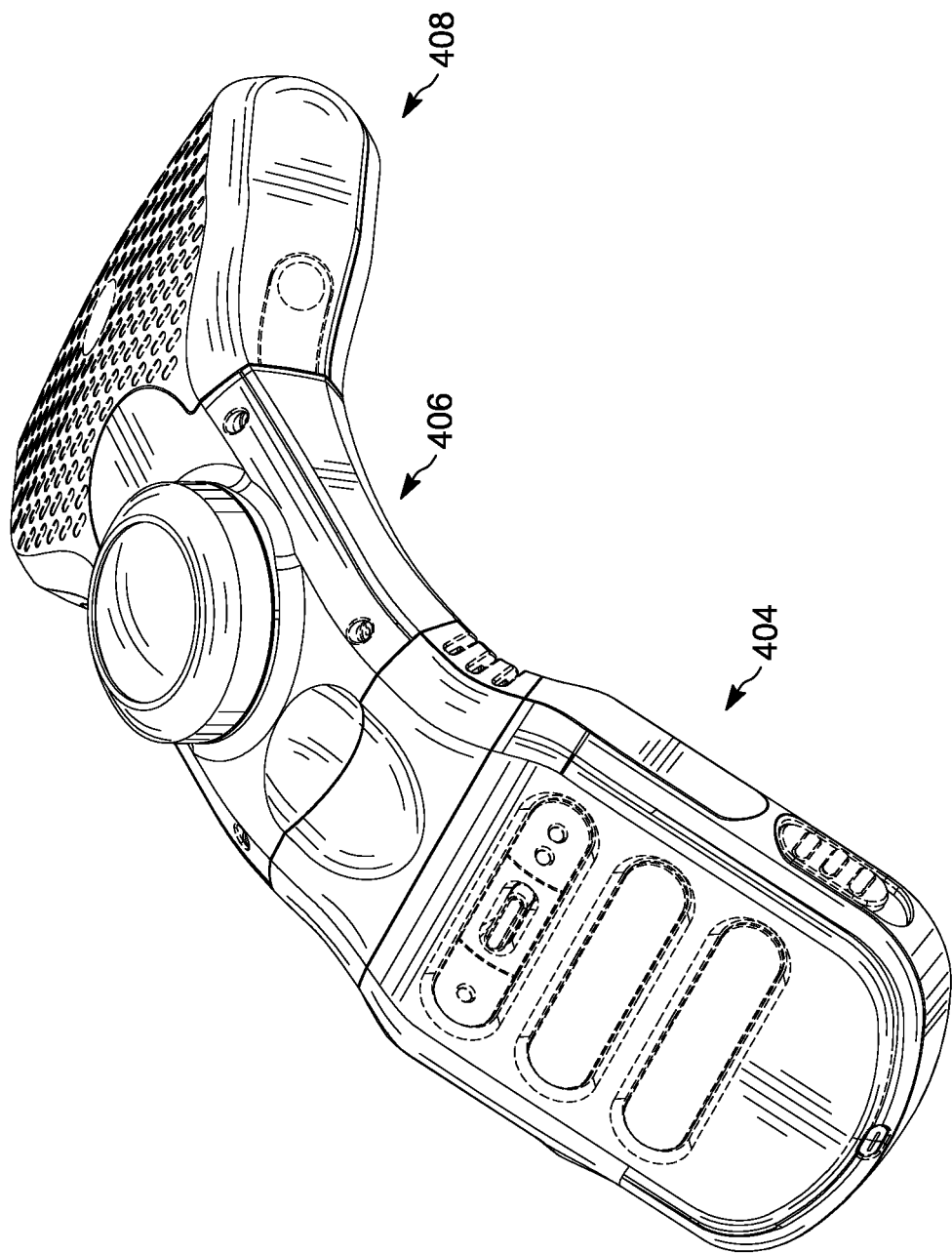
FIGS. 4A-4H provide several views of a portable communication device formed in accordance with a second embodiment.
Figure 4B:
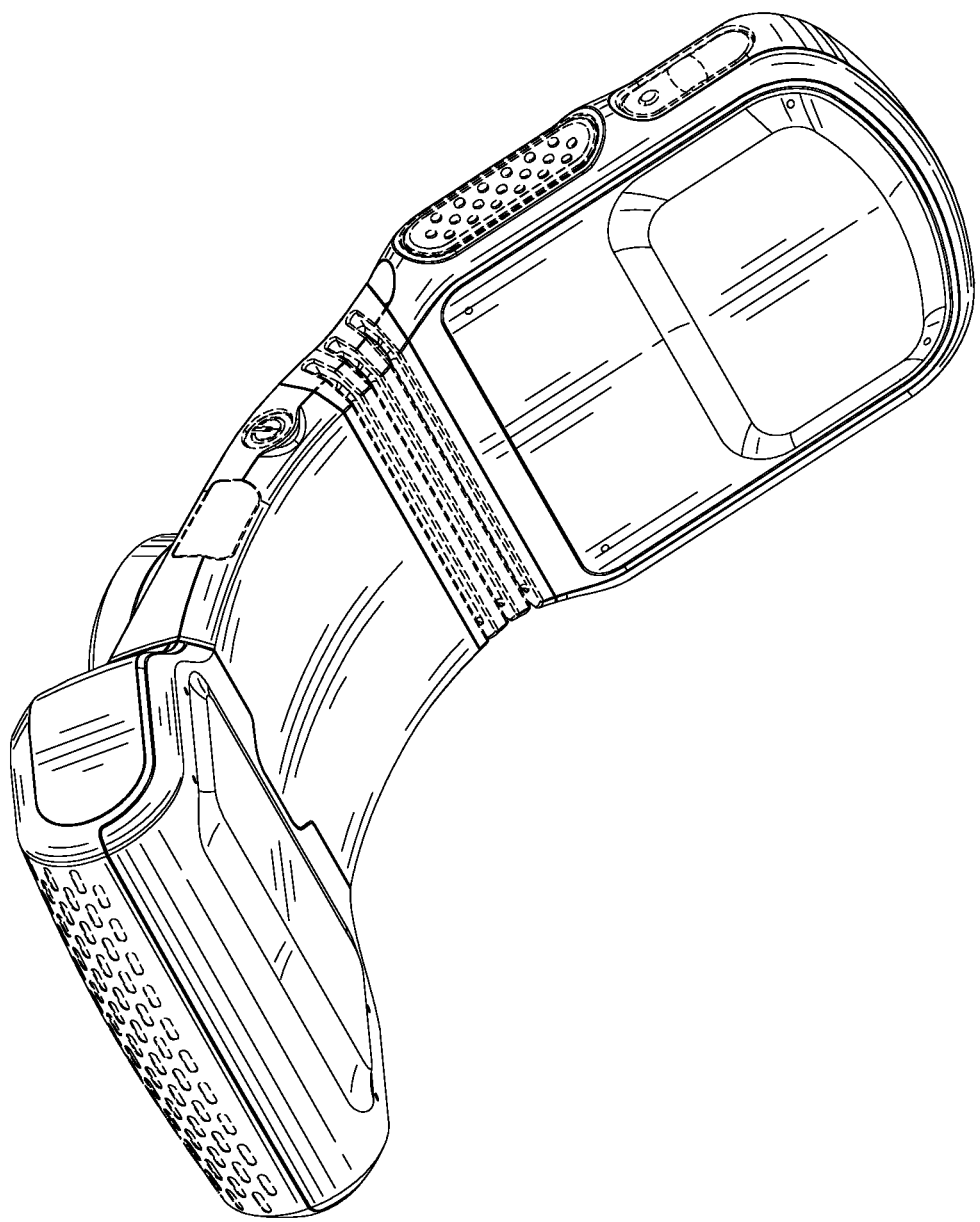
Figure 4C:
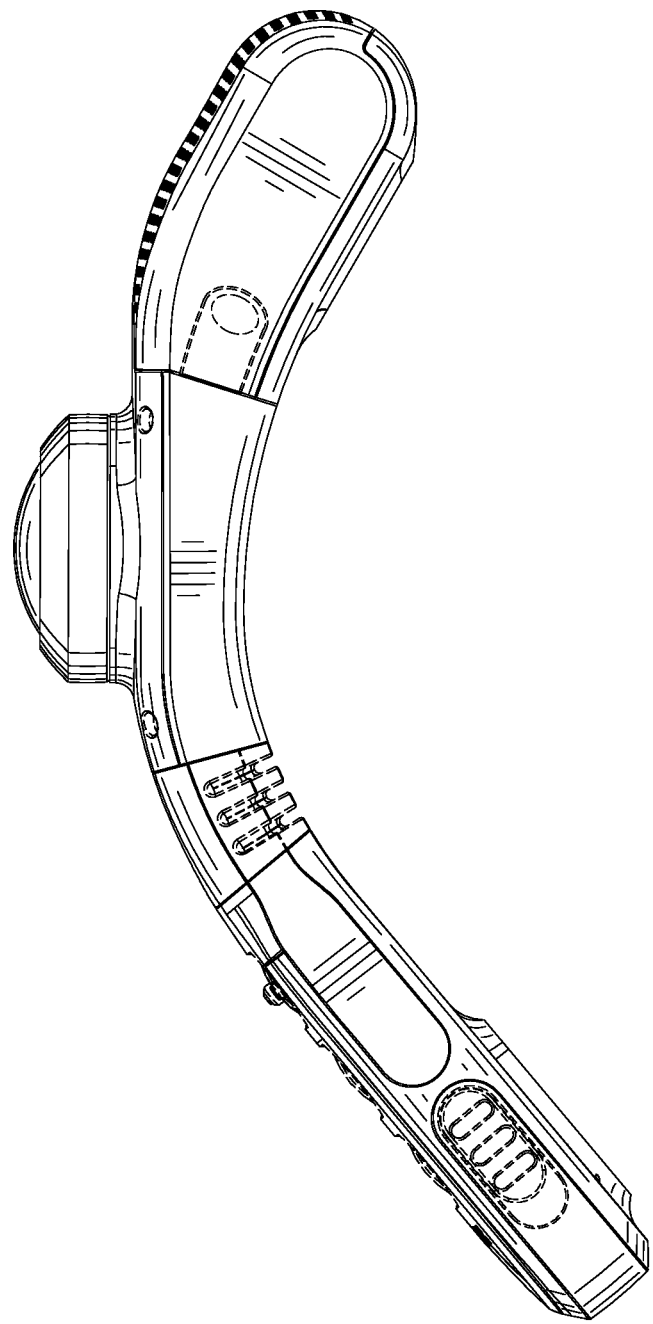
Figure 4D:
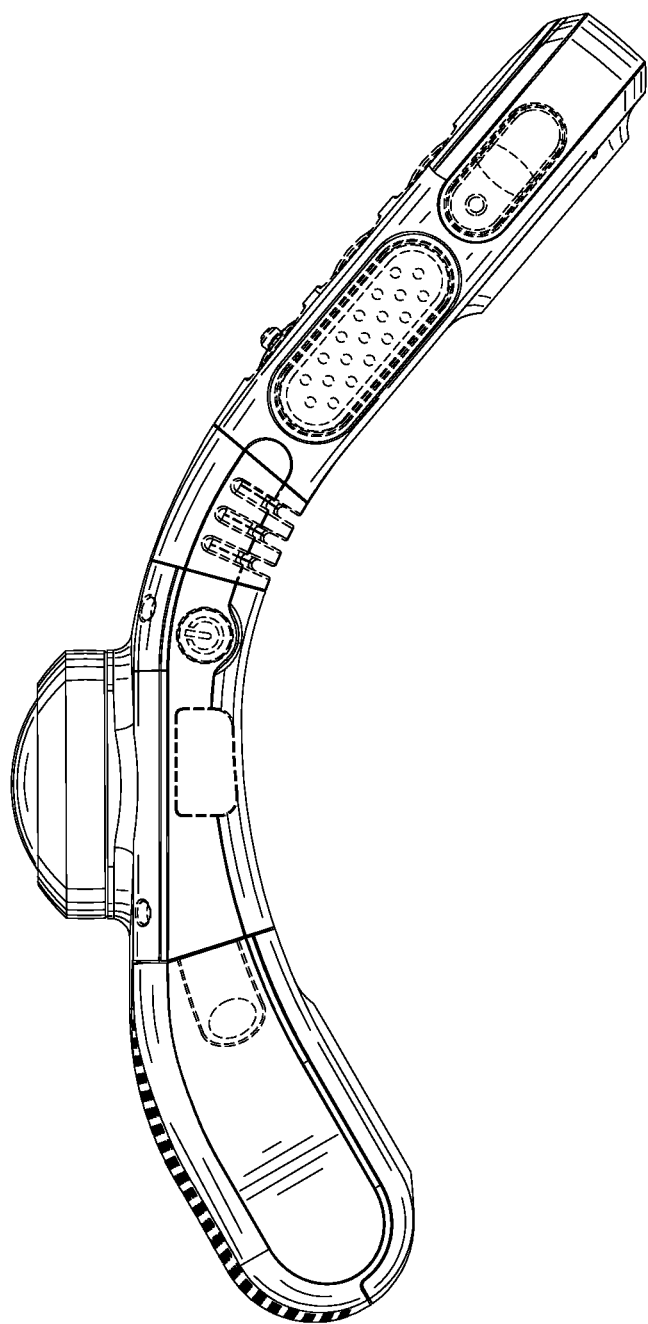
Figure 4E:
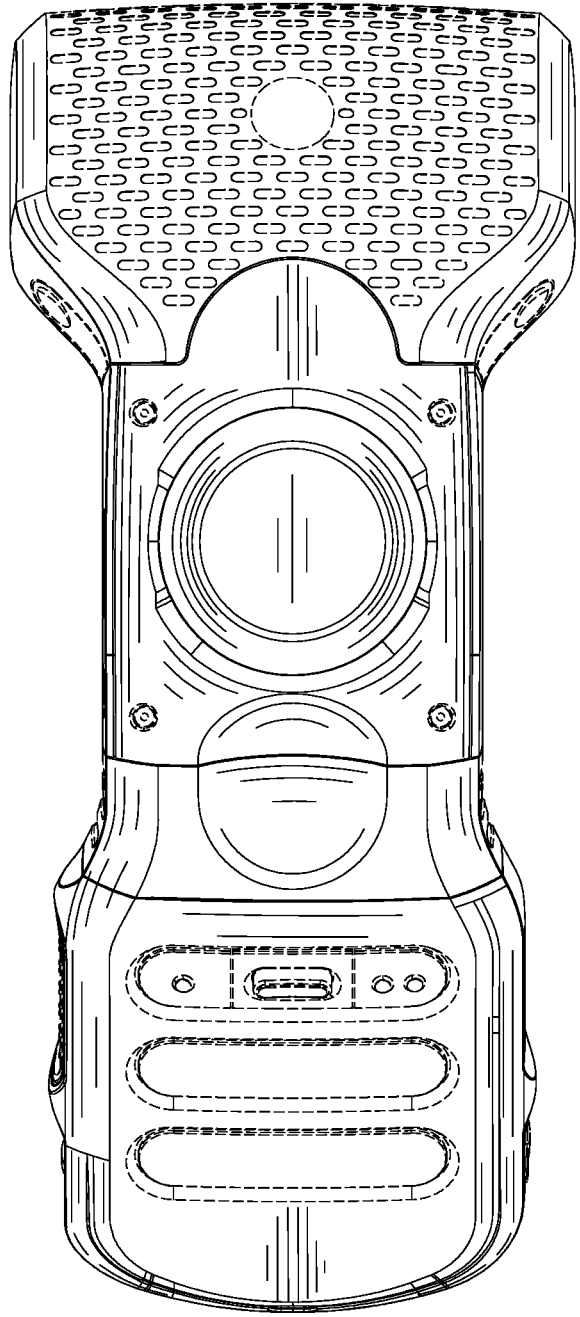
Figure 4F:
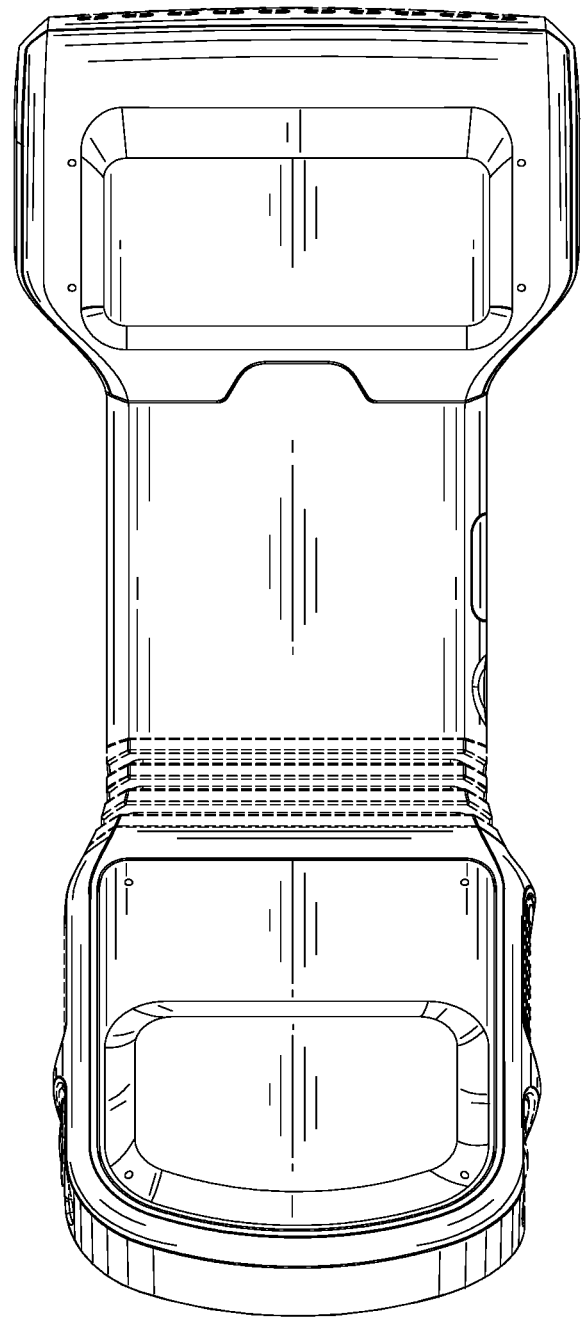
Figure 4G:
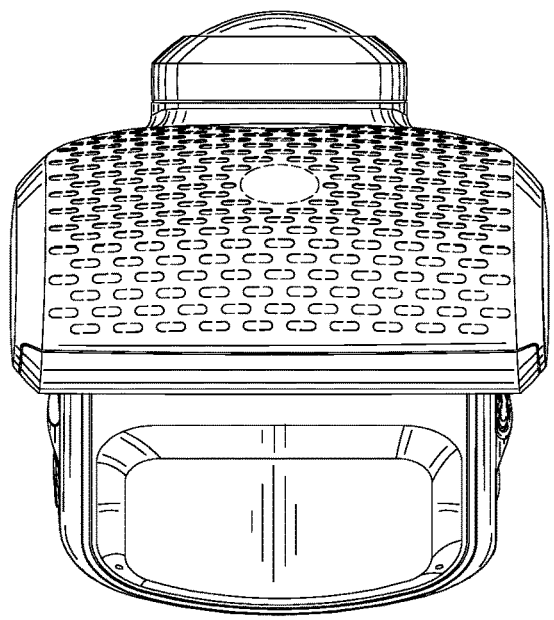
Figure 4H:
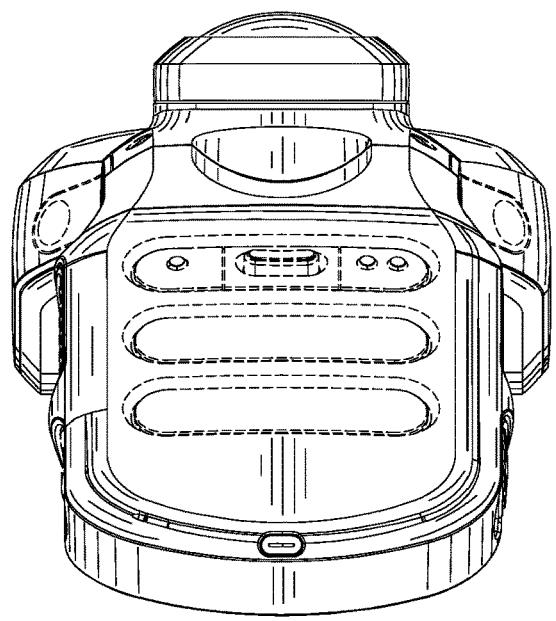

FIGS. 4A-4H provide several views of the portable communication device formed in accordance with a second embodiment. The second embodiment provides for the portable communication device having an interchangeable bridge interface module 406, comprising a hemispherical camera, mounted between the RSM 404 and a power source 408, shown as portable battery. FIG. 4A is an isometric view of the portable communication device. FIG. 4B is a back, isometric view of the portable communication device. FIG. 4C is a first side view of the portable communication device. FIG. 4D is a second side view of the portable communication device. FIG. 4E is a top view of the portable communication device. FIG. 4F is a bottom view of the portable communication device. FIG. 4G is a back view of the portable communication device. FIG. 4H is a front view of the portable communication device.

Figure 5A:
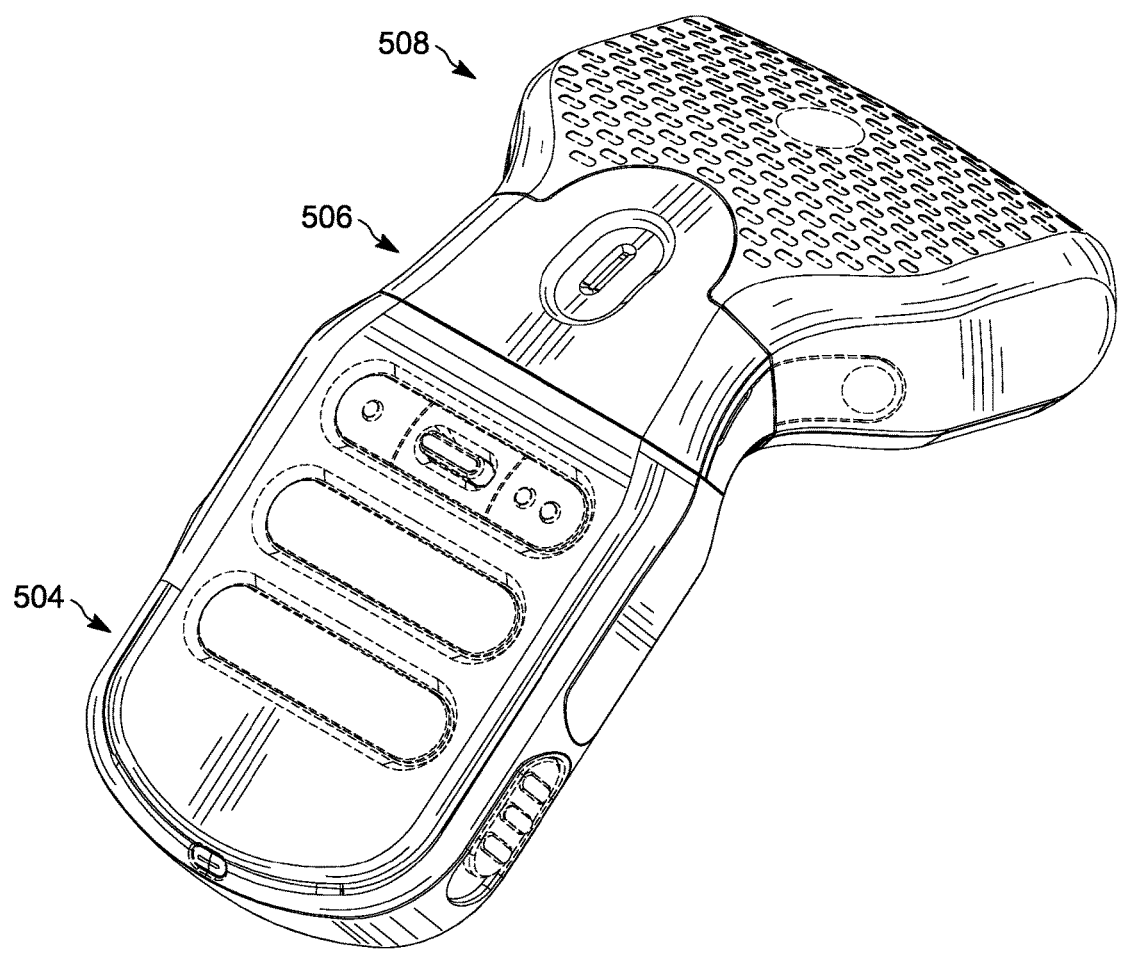
FIGS. 5A-5H provide several views of a portable communication device formed in accordance with a third embodiment.
Figure 5B:
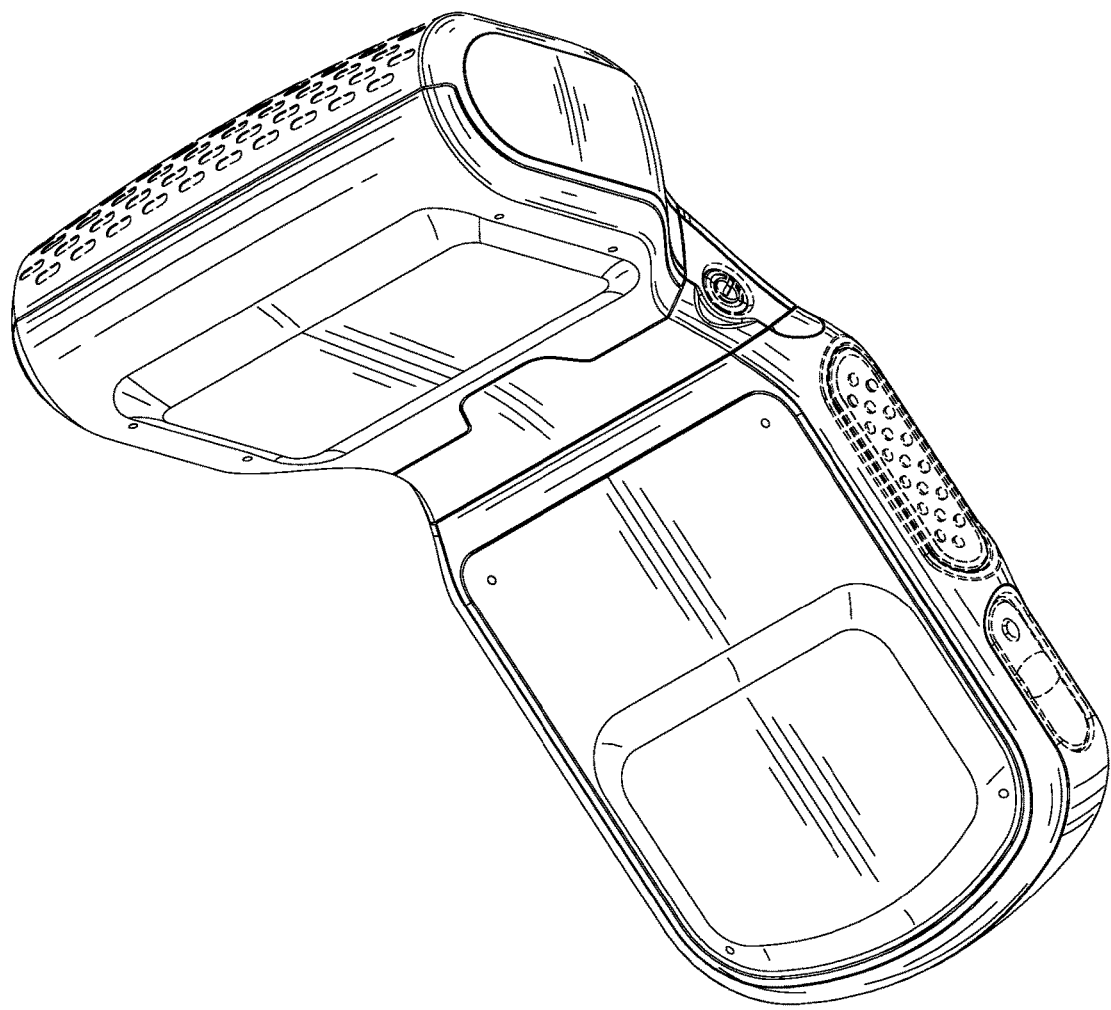
Figure 5C:
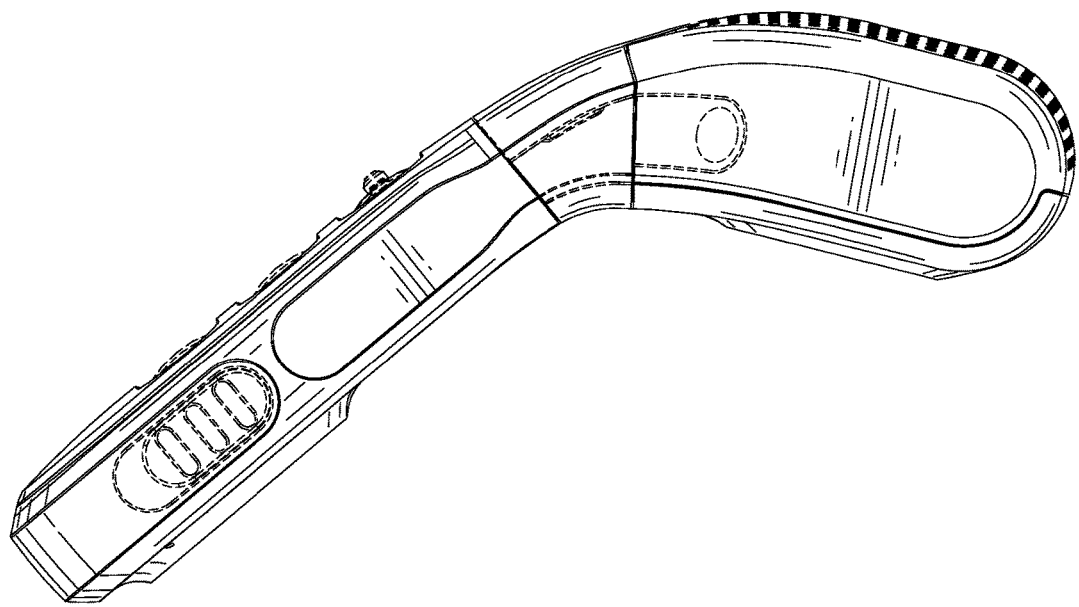
Figure 5D:
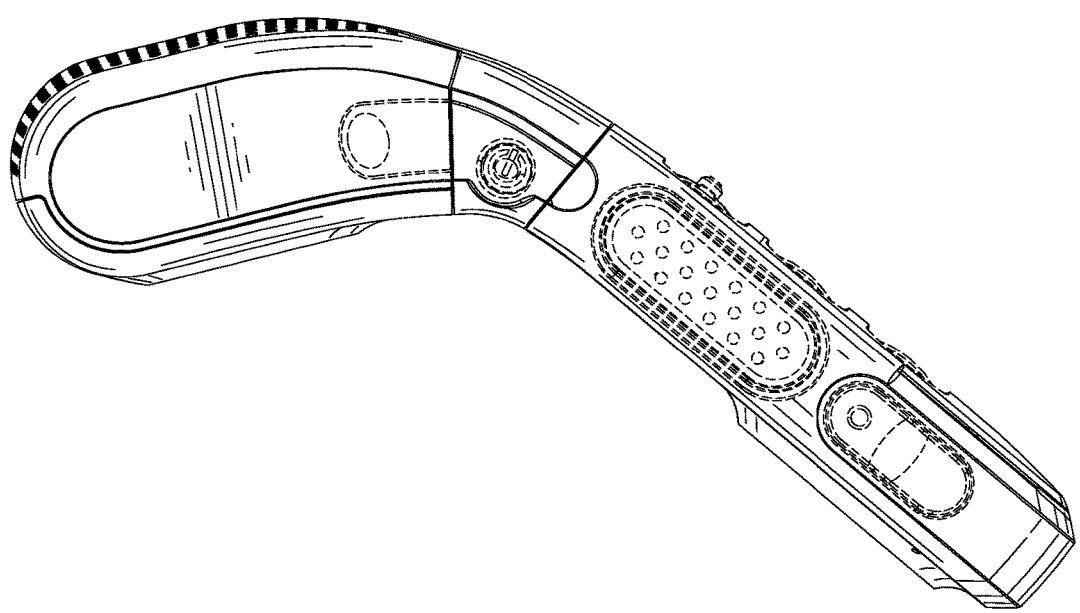
Figure 5E:
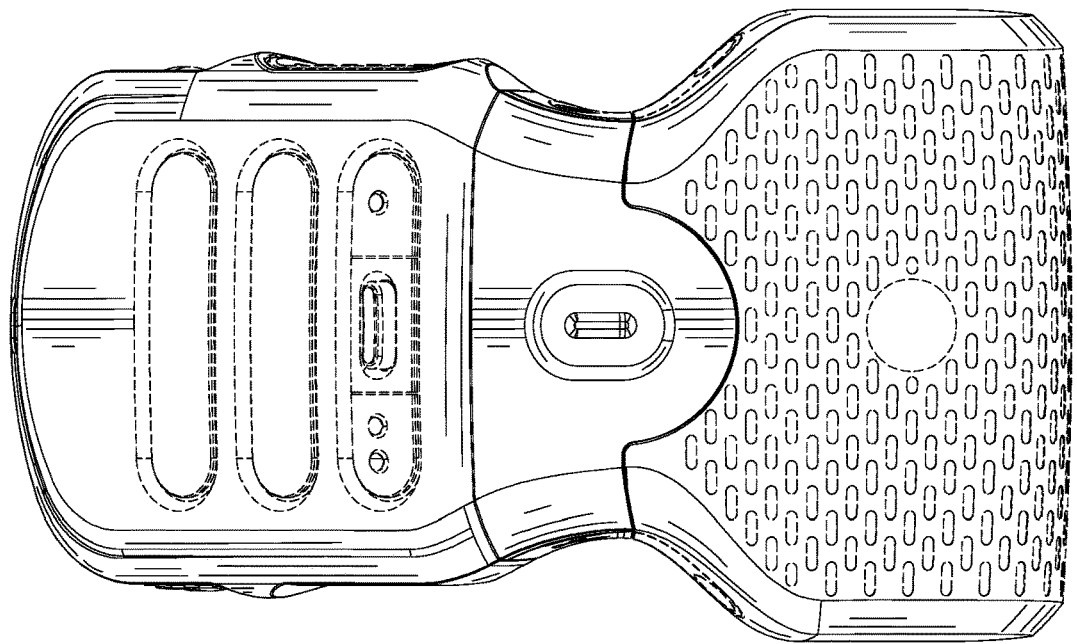
Figure 5F:
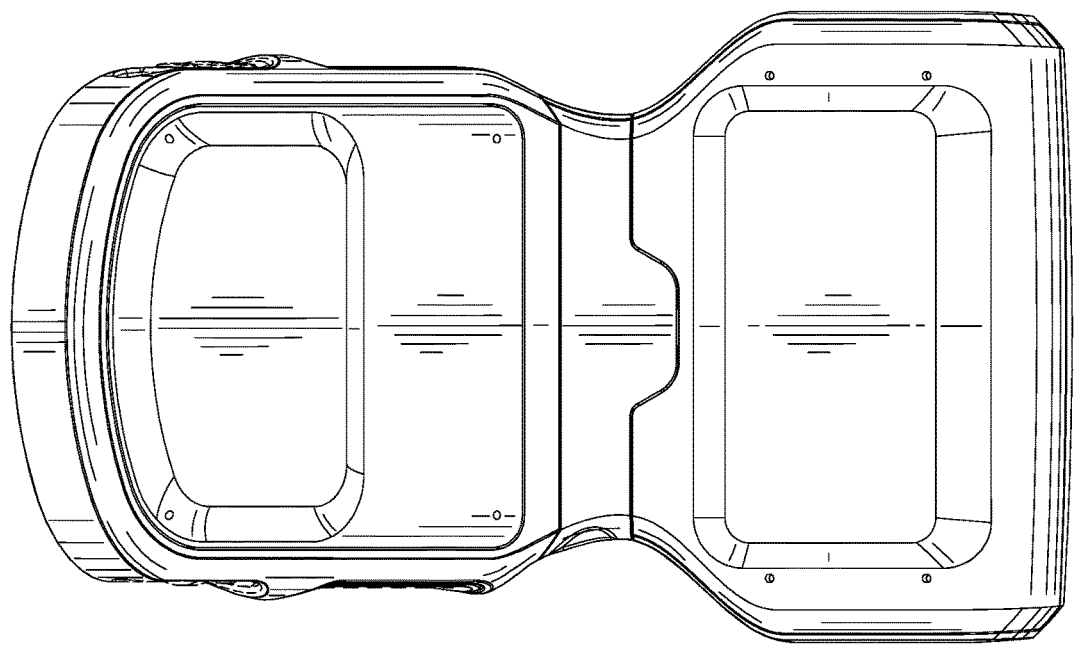
Figure 5G:
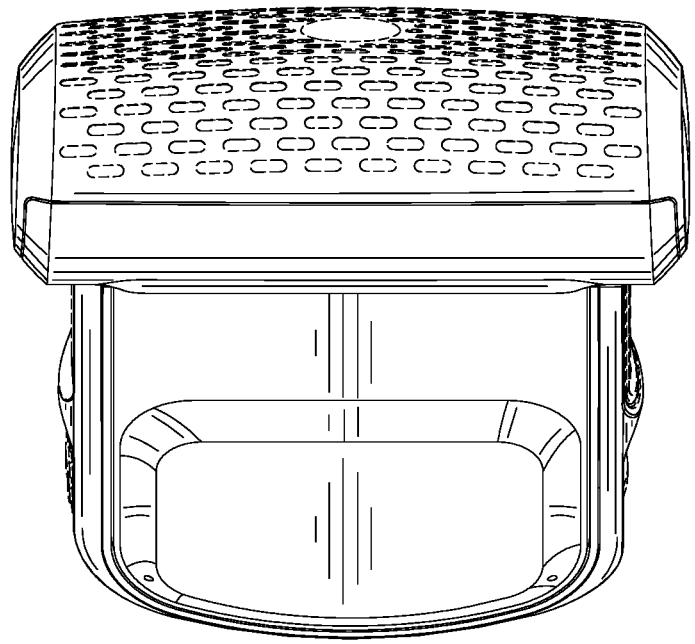
Figure 5H:
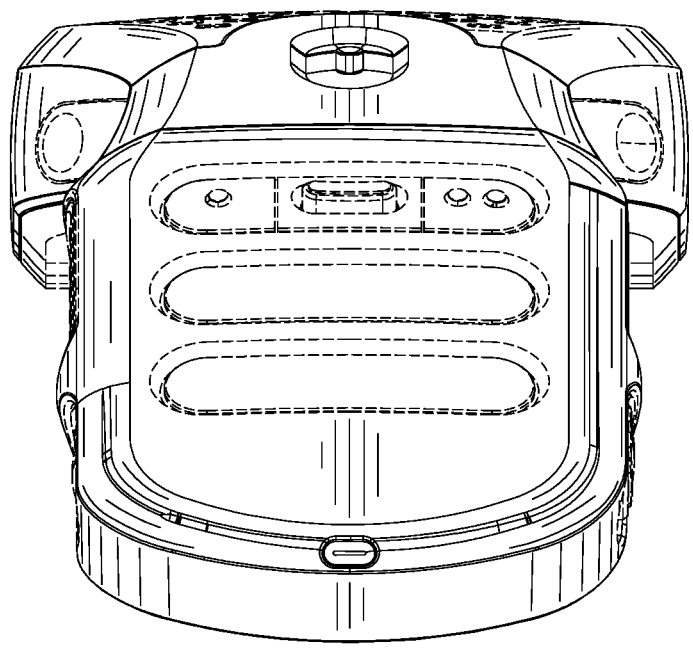

FIGS. 5A-5H provide several views of a portable communication device formed in accordance with a third embodiment. The third embodiment provides for the portable communication device having interchangeable bridge interface module 506, comprising a non-camera interface module, mounted between the RSM 504 and a power source module 508, shown here as a portable battery. FIG. 5A is an isometric view of the portable communication device. FIG. 5B is a back, isometric view of the portable communication device. FIG. 5C is a first side view of the portable communication device. FIG. 5D is a second side view of the portable communication device. FIG. 5E is a top view of the portable communication device. FIG. 5F is a bottom view of the portable communication device. FIG. 5G is a back view of the portable communication device. FIG. 5H is a front view of the portable communication device.

Figure 6A:
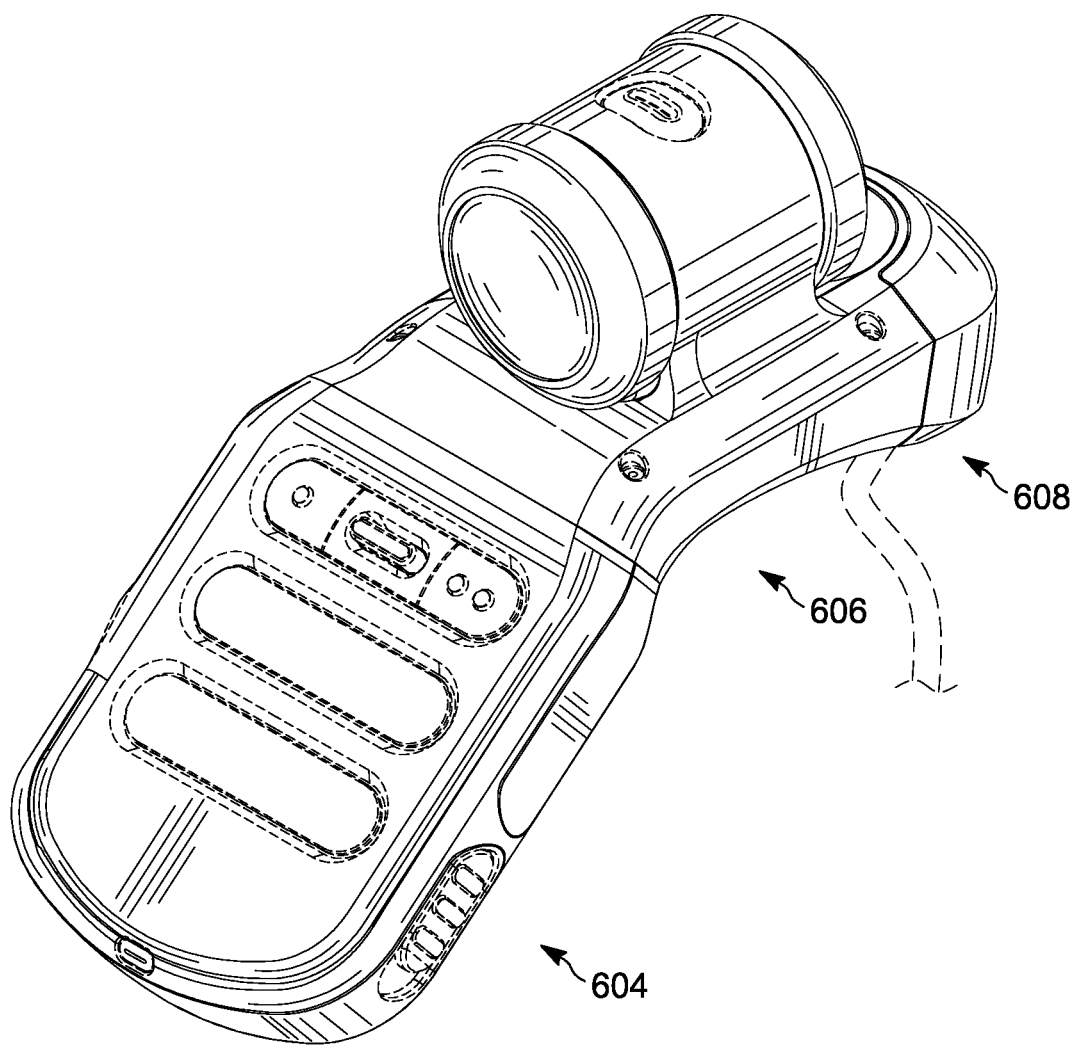
FIGS. 6A-6H provide several views of a portable communication device formed in accordance with a second embodiment.
Figure 6B:
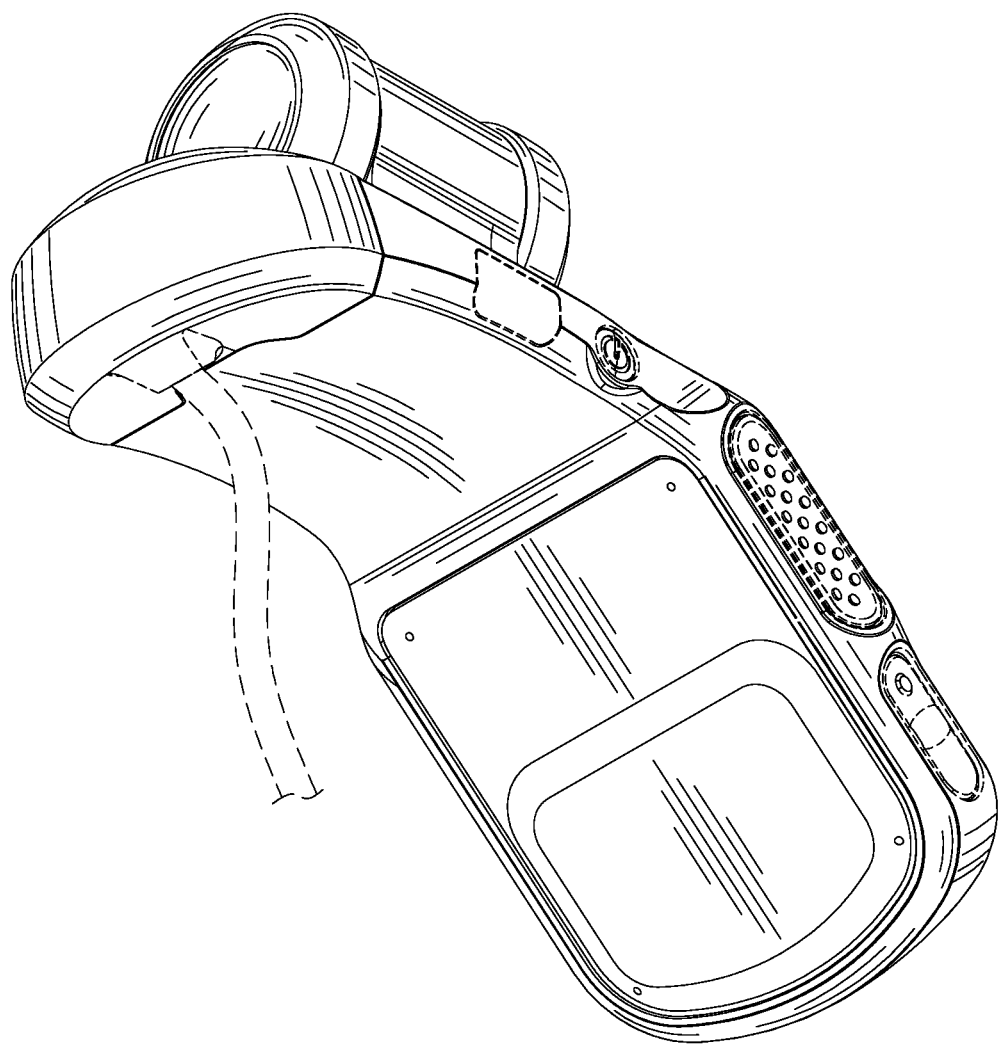
Figure 6C:
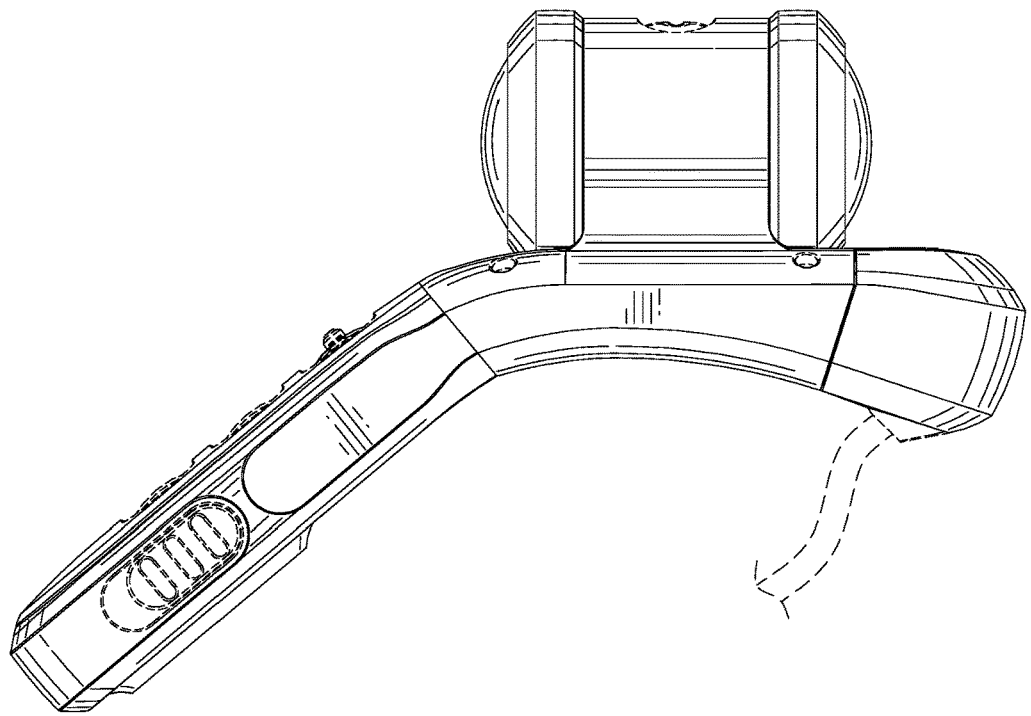
Figure 6D:
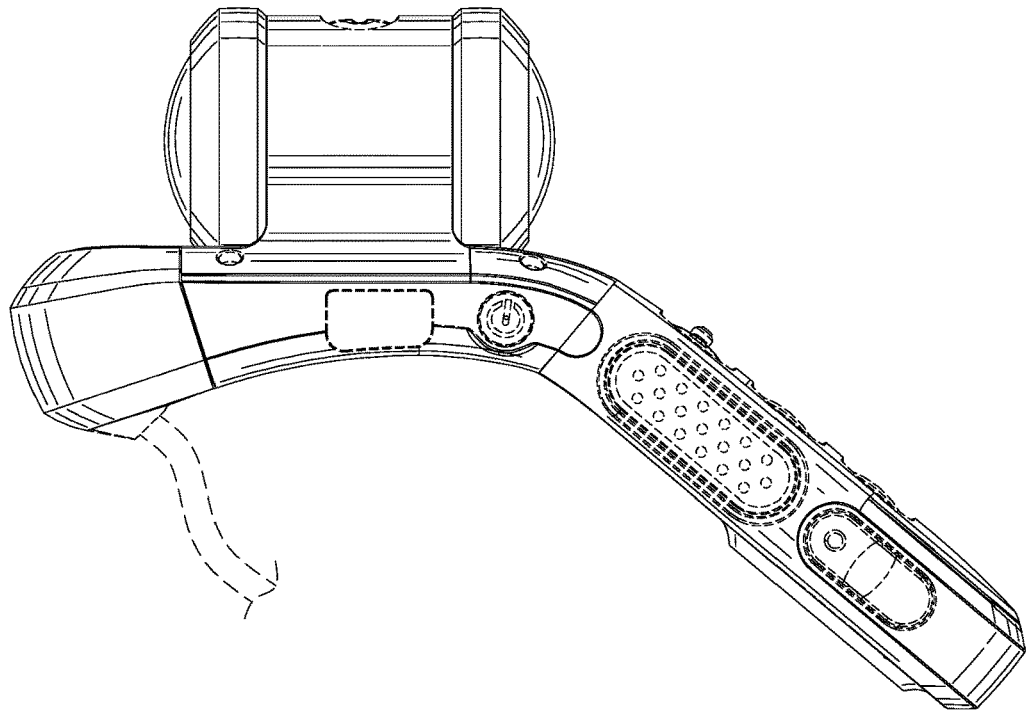
Figure 6E:
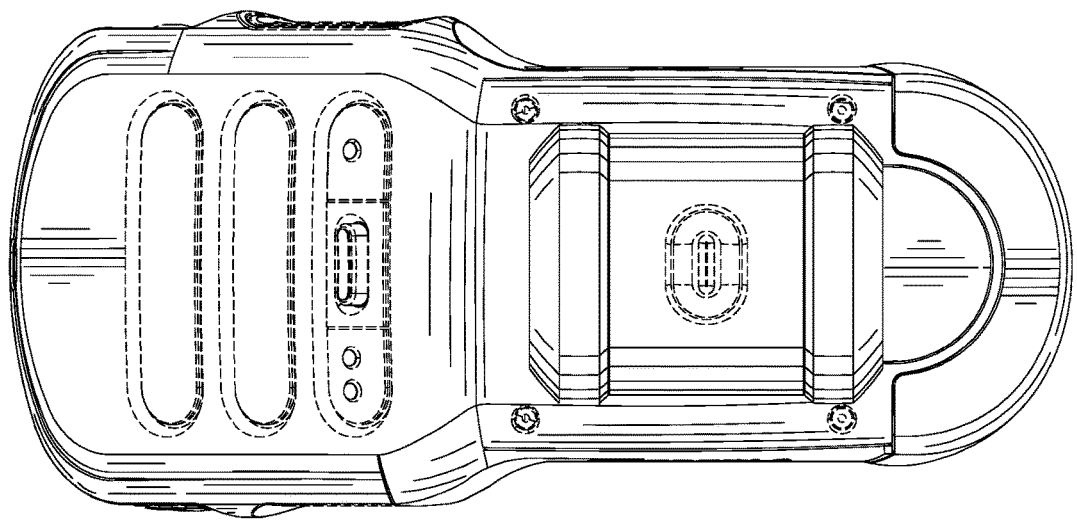
Figure 6F:
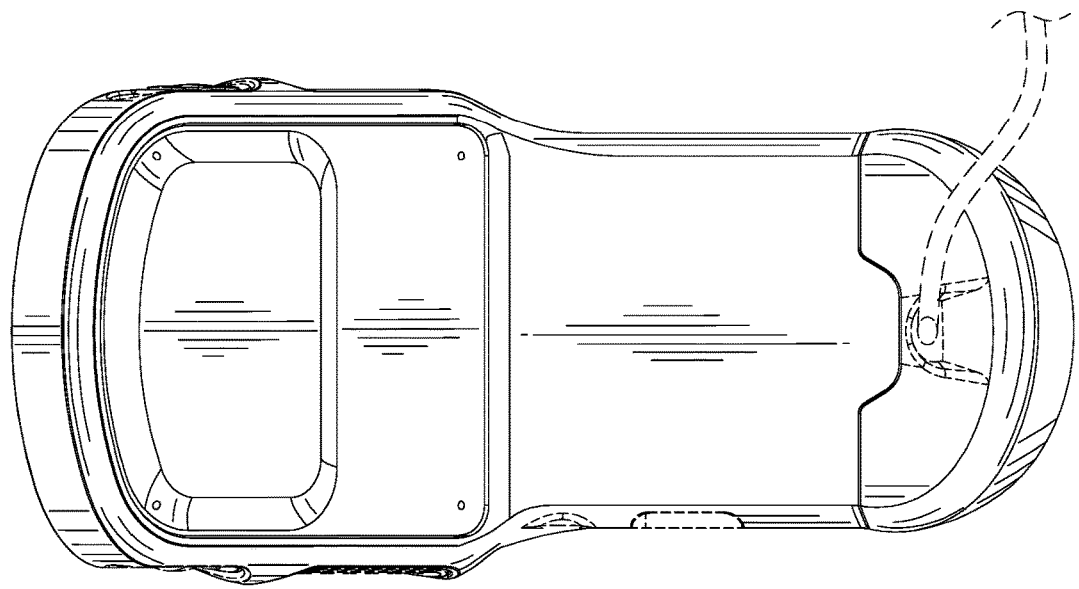
Figure 6G:
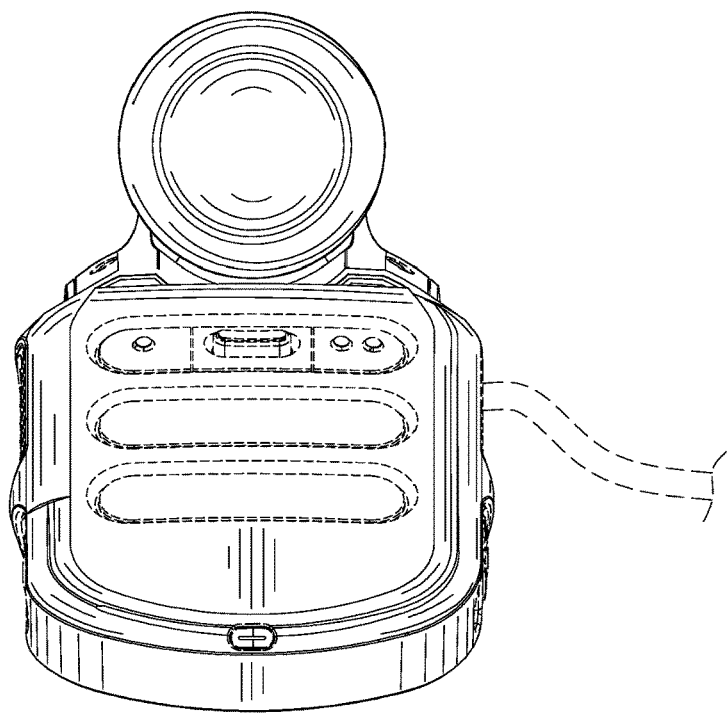
Figure 6H:
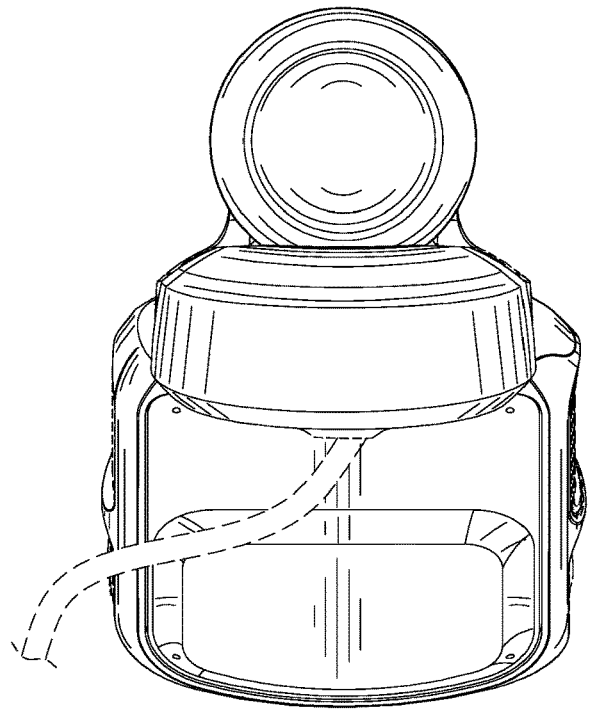

FIGS. 6A-6H provide several views of a portable communication device formed in accordance with a fourth embodiment. The fourth embodiment provides for the portable communication device having interchangeable bridge interface module 606, comprising a full spherical camera interface module, mounted between the RSM 604 and power source module 608, shown here as a cabled power source. FIG. 6A is an isometric view of the portable communication device. FIG. 6B is a back, isometric view of the portable communication device. FIG. 6C is a first side view of the portable communication device. FIG. 6D is a second side view of the portable communication device. FIG. 6E is a top view of the portable communication device. FIG. 6F is a bottom view of the portable communication device. FIG. 6G is a back view of the portable communication device. FIG. 6H is a front view of the portable communication device.

Figure 7A:
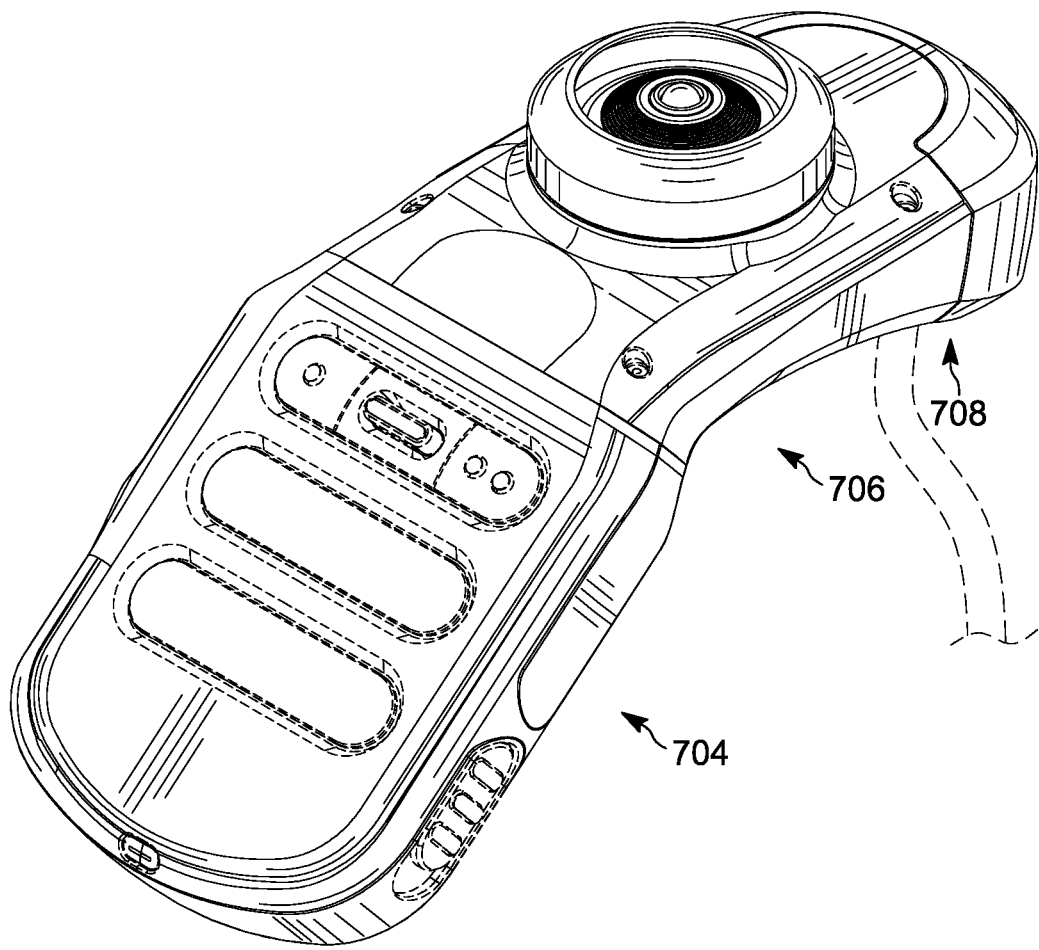
FIGS. 7A-7H provide several views of a portable communication device formed in accordance with a fourth embodiment.
Figure 7B:
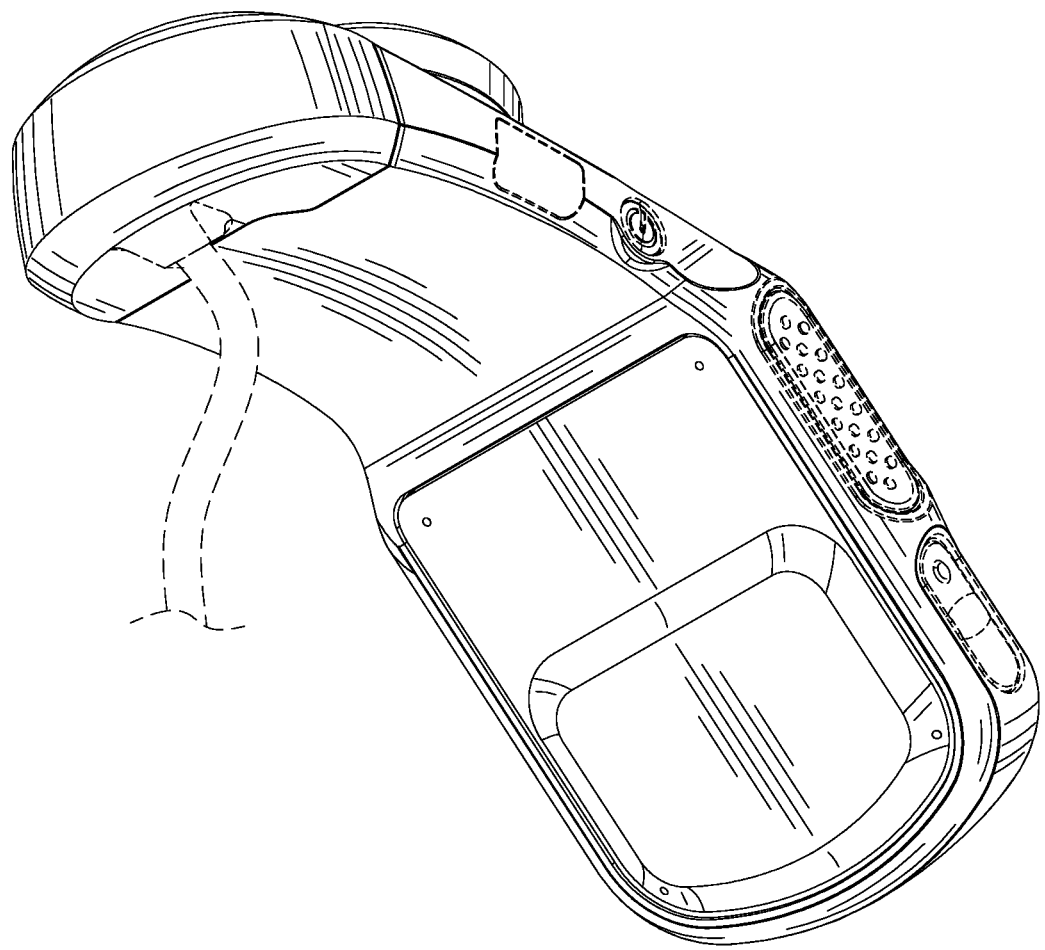
Figure 7C:
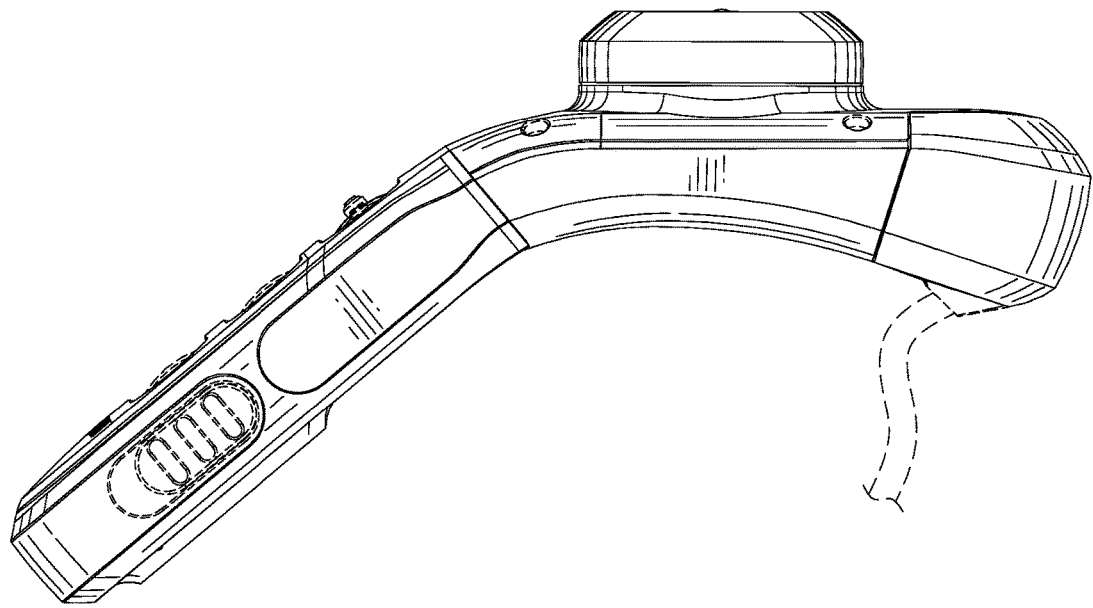
Figure 7D:
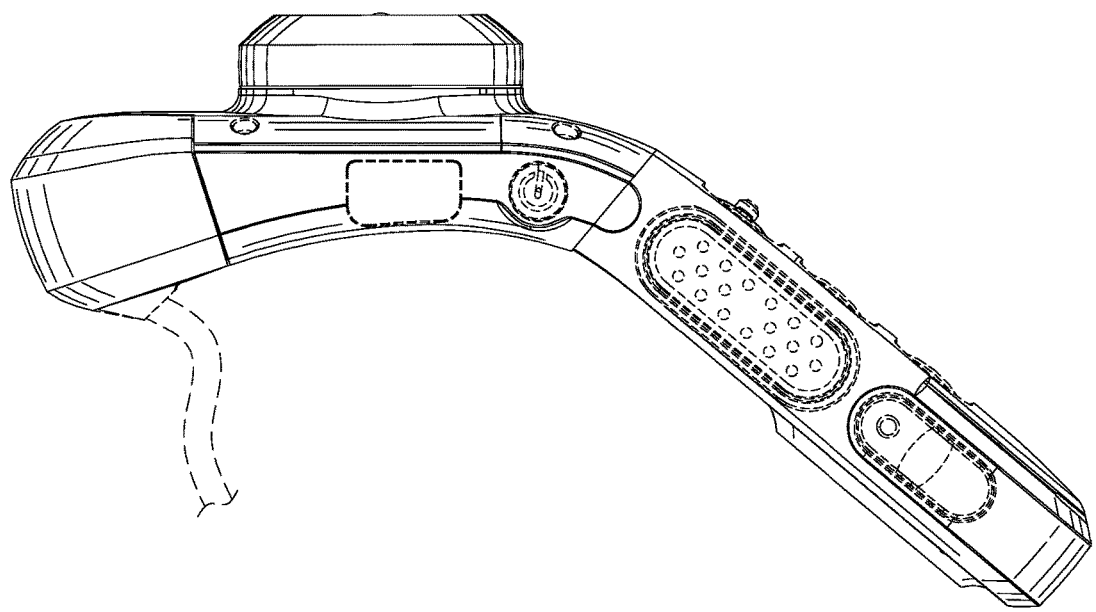
Figure 7E:
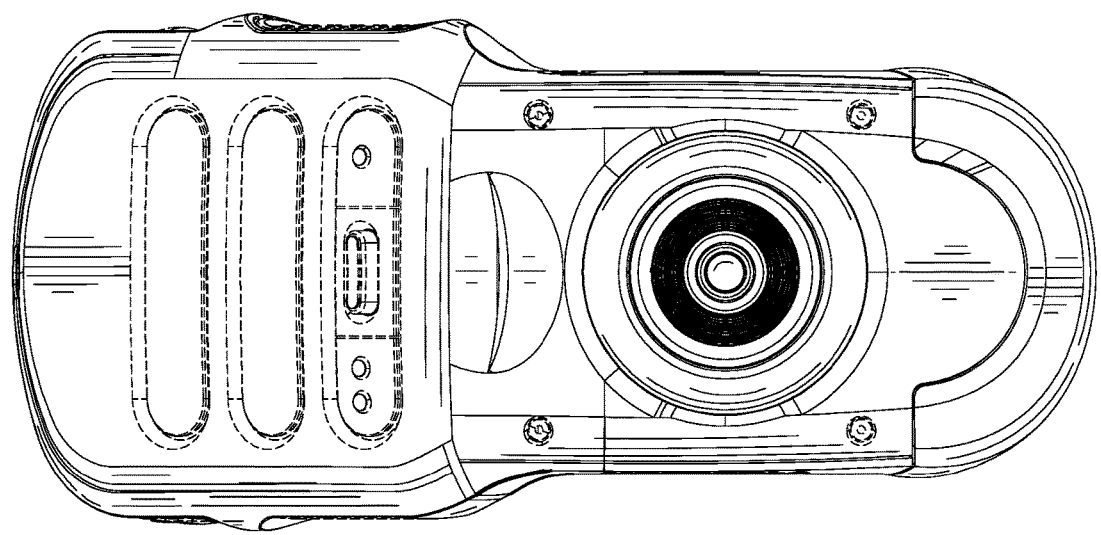

FIGS. 7A-7H provide several views of a portable communication device formed in accordance with a fourth embodiment. FIGS. 7A-7H provide several views of a portable communication device formed in accordance with a fifth embodiment. The fifth embodiment provides for the portable communication device having a interchangeable bridge interface module 706, shown here as a hemispherical camera interface module, mounted between the RSM 704 and a power source module 708, shown here as cabled power source. FIG. 7A is an isometric view of the portable communication device. FIG. 7B is a back, isometric view of the portable communication device. FIG. 7C is a first side view of the portable communication device. FIG. 7D is a second side view of the portable communication device. FIG. 7E is a top view of the portable communication device.

Figure 7F:
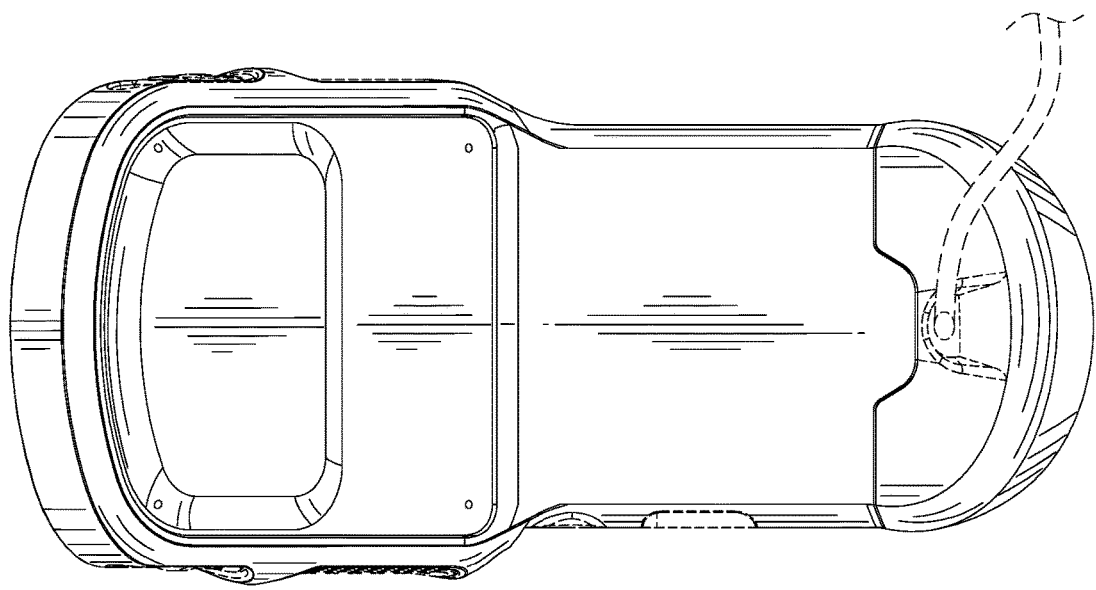
Figure 7G:
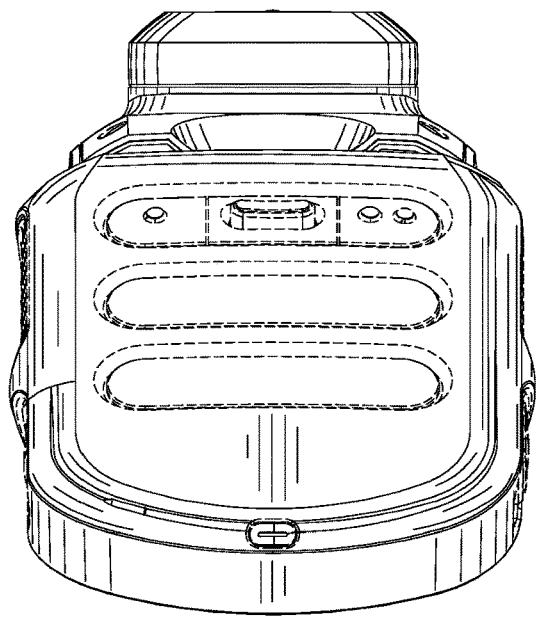
Figure 7H:
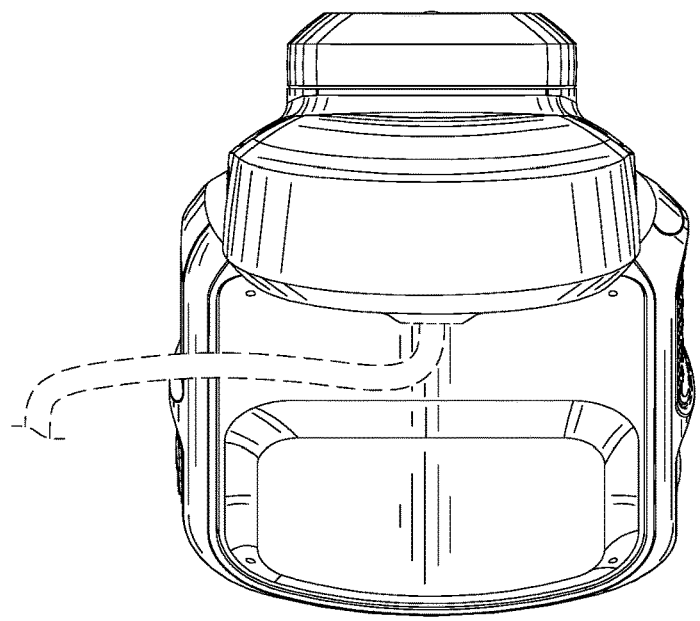

FIG. 7F is a bottom view of the portable communication device. FIG. 7G is a back view of the portable communication device. FIG. 7H is a front view of the portable communication device.

Hence, the various embodiments of the portable communication device shown and described, provide for a shoulder mountable RSM with a dedicated power source along with modular adaptability for accepting interchangeable bridged interface modules between the RSM in the form of a camera module and a non-camera module and the power source in the form of a portable battery and a corded power source.

Figure 8:
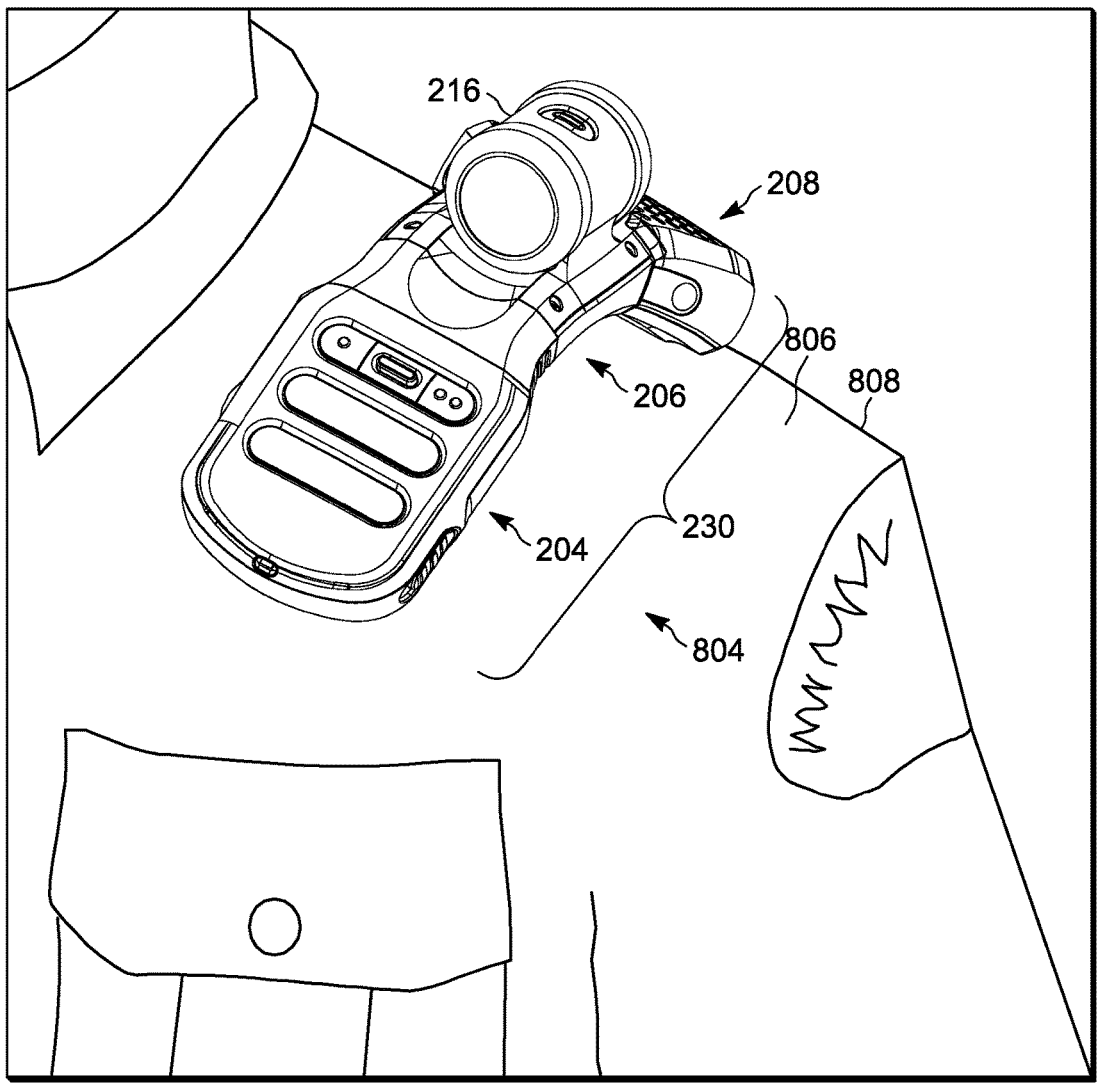
FIG. 8 shows one of the portable communication devices worn on a user's shoulder in accordance with some of the embodiments.

FIG. 8 shows a portable communication device formed in accordance with the embodiments in a body worn application 800 and operating as a public safety communication device. The portable communication device embodied in operation design derivative 230 of FIG. 2 is shown mounted upon a user's shoulder. However any of the portable communication device configurations provided by the various embodiments can be similarly worn upon the shoulder. The portable communication device 230 is mounted to a garment 802, such as a vest, coat, jacket, or as shown in this view, a shirt. A variety of attachment features, including but not limited to clips, snaps, magnets, slide-in features, hook and loop, straps, shoulder harness or holster arrangements and/or epaulette interfaces can be used to mount the portable communication device to the garment 802 at the shoulder. In accordance with some of the embodiments, the portable communication device 230 comprises the RSM 204, interface bridge module 206, shown with full spherical camera 216, and power source portion 208, shown as portable battery 212.

In accordance with the embodiments, the RSM 204 forms a front portion of the portable communication device 230, interface bridge module 206, forms a middle portion of the portable communication device 230, and the power source module 208 forms a back portion of the portable communication device 230. The portable communication device is formed generally in a reverse u-shape that is well suited to shoulder mountable applications and allows the device to provide a close to the body form factor. The embodiments of the portable communication device advantageously negate any need for protruding or extended parts. The RSM 204 conforms to a front shoulder portion 804, the interface bridge module 206 conforms to a top shoulder portion 806, and the power source module 208 conforms to a back shoulder portion 808.

The various embodiments of the portable communication device provide significant advantages over standard RSMs in terms of improved weight distribution by locating the power source to conform to a back shoulder portion 808. The power source module 208, embodied as a portable battery in reverse T-shape, is sized and shaped to minimize rearward projection and thus well suited for applications in which the user is seated in a vehicle. With the camera interface module 210 is coupled between the power module 208 and the RSM 204, the user can advantageously utilize RSM controls, such as push-to-talk (PTT) and volume control, while capturing video via camera interface module 210 simultaneously.

The modular interface providing interchangeable modules between the RSM 204 and power source module 208 allows a user to have the option of RSM-only operation and RSM-video recording operation. The interchangeable modules provided by the various embodiments may be attached to and removed from the RSM 204 to form a portable communication device customized to a customer's usage requirements. The attaching and detaching of the modules may be factory configured or user configured. For example, in some embodiments, when video recording is no longer desired, the camera interface bridge module can be removed and replaced, to change to a non-camera bridge interface module 220, shown in FIG. 2. The modular interface providing interchangeable modules between the RSM 204 and power source module 208 thus allows a user to have the option of RSM-only operation and RSM-video recording operation.

Accordingly, there has been provided a portable, body wearable communication device that can accommodate a plurality of different modules, such as a video camera and/or power module. The embodiments have provided for a shoulder mountable portable public safety communication device that advantageously provides a RSM with interchangeable camera and non-camera bridge interface modules. The embodiments have further provided portable battery or corded power modules.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device, comprising:
   a remote speaker microphone (RSM);
   a power source module, the RSM and power source module being adaptable to a plurality of interchangeable bridge interface modules, the plurality of interchangeable bridge interface modules comprising:
   a camera interface module coupled between the RSM and power source module; and
   a non-camera interface module providing direct connection between the RSM and power module, wherein: the RSM, each of the plurality of interchangeable bridge interface modules, and the power source module couple to form a shoulder mountable portable communication device;
   wherein the plurality of interchangeable bridge interface modules each adapt the RSM for a plurality of portable operational design derivatives comprising:
   RSM with full spherical video camera;
   RSM with hemispherical video camera; and
   RSM without video camera; and
   wherein the power source module device is also interchangeable as one of:
   a portable battery; and
   a cabled power source module that acquires power from an external body-worn battery.

2. The portable communication device of claim 1, wherein the camera interface module comprises at least one of:
   a full spherical video camera interface module; and
   a hemispherical video camera interface module.

3. The portable communication device of claim 1, wherein the portable communication device is a public safety body wearable, shoulder mountable portable communication device.

4. The portable communication device of claim 1, wherein the RSM forms a front portion of the portable communication device, each of the plurality of interchangeable bridge interface modules forms a middle portion of the portable communication device; and the power source module forms a back portion of the portable communication device.

5. The portable communication device of claim 1, wherein
   the power source module is a portable battery; and
   the interchangeable interface bridge module coupled to the portable battery forms a reverse T-shape configuration on the back portion of the portable communication device.

6. The portable communication device of claim 5, wherein the reverse T-shape configuration on the back portion of the portable communication device minimizes the rearward projection of the portable battery when the portable communication device is shoulder mounted.

7. The portable communication device of claim 1, further comprising:
   a flexible interconnect module coupled between the RSM and the interchangeable bridge interface module.

8. The portable communication device of claim 1, wherein the shoulder mountable portable communication device comprises a public safety communication device.

9. The portable communication device of claim 1, wherein the RSM provides a front portion, the interchangeable bridge interface provides a middle portion and the power source module provides a back portion for shoulder mountable applications.

10. The portable communication device of claim 1, wherein the power source module is sized to minimize rearward projection from a shoulder.

11. The portable communication device of claim 1, the portable communication device is mountable to a garment.

12. The portable communication system of claim 1, wherein rearward projection of the power source module is minimized to avoid physical interference with an external object.

* * * * *